US012198493B2

(12) United States Patent
Ajhar et al.

(10) Patent No.: US 12,198,493 B2
(45) Date of Patent: *Jan. 14, 2025

(54) GAMING DEVICES, SYSTEMS, AND METHODS FOR REUSING WILD SYMBOLS

(71) Applicant: IGT, Las Vegas, NV (US)

(72) Inventors: Nathan Ajhar, Sparks, NV (US); Chris Peterson, Reno, NV (US); Nick Hillstrom, Reno, NV (US); Yu Chong, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,950

(22) Filed: Dec. 15, 2022

(65) Prior Publication Data

US 2023/0119213 A1 Apr. 20, 2023

Related U.S. Application Data

(63) Continuation of application No. 17/211,302, filed on Mar. 24, 2021, now Pat. No. 11,562,618.

(51) Int. Cl.
*G07F 17/32* (2006.01)

(52) U.S. Cl.
CPC ........ *G07F 17/3213* (2013.01); *G07F 17/323* (2013.01); *G07F 17/3265* (2013.01)

(58) Field of Classification Search
CPC ............... G07F 17/3213; G07F 17/323; G07F 17/3244; G07F 17/3246; G07F 17/3255; G07F 17/3258; G07F 17/326; G07F 17/3262; G07F 17/3265; G07F 17/3267; G07F 17/34
See application file for complete search history.

(56) References Cited

U.S. PATENT DOCUMENTS

| | | | |
|---|---|---|---|
| 6,120,378 A | 9/2000 | Moody et al. | |
| 8,147,334 B2 | 4/2012 | Gatto et al. | |
| 8,764,566 B2 | 7/2014 | Miltenberger et al. | |
| 10,783,748 B1 | 9/2020 | Peterson et al. | |
| 11,562,618 B2 | 1/2023 | Ajhar et al. | |
| 11,972,656 B2 * | 4/2024 | Ajhar | G07F 17/323 |
| 2004/0072612 A1 | 4/2004 | Rodgers et al. | |
| 2006/0068893 A1 | 3/2006 | Jaffe et al. | |

(Continued)

OTHER PUBLICATIONS

Official Action for U.S. Appl. No. 17/211,302, dated May 31, 2022 9 pages.

(Continued)

*Primary Examiner* — Milap Shah
(74) *Attorney, Agent, or Firm* — Sheridan Ross P.C.

(57) ABSTRACT

A method comprises initiating a gaming session for a grid-based game, tracking a number of consecutive losing plays of the grid-based game during the gaming session, and providing a player of the grid-based game with an option to reuse a wild symbol that appears in one play of the number of consecutive losing plays in a next play when the number of consecutive losing plays exceeds a threshold. The method further comprises receiving first input from the player to reuse the wild symbol in the next play, generating, in response to the first input, a sequence of symbols comprising the wild symbol, and causing a display to display the sequence of symbols populated in the array of cells.

19 Claims, 14 Drawing Sheets

(56) References Cited

U.S. PATENT DOCUMENTS

| | | | | |
|---|---|---|---|---|
| 2006/0258422 | A1* | 11/2006 | Walker | G07F 17/32 463/7 |
| 2008/0113705 | A1 | 5/2008 | Moody et al. | |
| 2009/0075722 | A1 | 3/2009 | Louie et al. | |
| 2011/0059788 | A1 | 3/2011 | Itagaki et al. | |
| 2013/0190065 | A1 | 7/2013 | Saunders | |
| 2013/0190066 | A1 | 7/2013 | Saunders | |
| 2014/0121000 | A1 | 5/2014 | Porter | |
| 2014/0342806 | A1 | 11/2014 | Marks et al. | |
| 2021/0110633 | A1 | 4/2021 | Halvorson et al. | |

OTHER PUBLICATIONS

Notice of Allowance for U.S. Appl. No. 17/211,302, dated Sep. 20, 2022 7 pages.

Official Action for U.S. Appl. No. 18/077,758, dated Aug. 22, 2023 5 pages.

* cited by examiner

GAMING DEVICES, SYSTEMS, AND METHODS FOR REUSING WILD SYMBOLS

CROSS REFERENCE TO RELATED APPLICATIONS

The present application is a continuation of and claims priority to U.S. application Ser. No. 17/211,302, filed Mar. 24, 2021, the entire disclosure of which is hereby incorporated by reference.

BACKGROUND

The present disclosure is generally directed to gaming devices, systems, and methods for reusing wild symbols, for example, in a grid-based game.

Gaming machines typically offer a number of built-in game play features that contribute to the overall player experience. Any type of game play feature that presents the player with an additional opportunity to win is often viewed as desirable and can lead to increased play of the gaming machine.

BRIEF SUMMARY

In certain embodiments, a method comprises initiating a gaming session for a grid-based game arranged as an array of cells to be populated with symbols for plays of the grid-based game, tracking a number of consecutive losing plays of the grid-based game during the gaming session, and providing a player of the grid-based game with an option to reuse a wild symbol that appears in one play of the number of consecutive losing plays in a next play when the number of consecutive losing plays exceeds a threshold. The method may further comprise receiving first input from the player to reuse the wild symbol in the next play, generating, in response to the first input, a sequence of symbols comprising the wild symbol, and causing a display to display the sequence of symbols populated in the array of cells.

In certain embodiments, a device comprises one processor and memory comprising instructions that when executed by the processor cause the processor to initiate a gaming session for a grid-based game, the grid-based game being arranged as an array of cells to be populated with symbols, determine, during the gaming session, that a losing play of the grid-based game comprises a wild symbol, and store, in the memory, a pointer indicating a first cell position of where the wild symbol appeared in the array of cells for the losing play. The instructions, when executed by the processor, cause the processor to determine that a number of consecutive losing plays exceeds a threshold, provide, in response to determining that the number of consecutive losing plays exceeds a threshold, a player of the grid-based game with an option to reuse the wild symbol in a next play, receive player input from the player indicating a desire to reuse the wild symbol in the next play, determine, based on the pointer, a second cell position of where the wild symbol appears in the array of cells for the next play, generate, based on the player input, a sequence of symbols comprising the wild symbol, and cause a display to display the sequence of symbols populated in the array of cells with the wild symbol in the second cell position in the array of cells.

In certain embodiments, a gaming device comprises a display, a processor, and memory comprising instructions that when executed by the processor cause the processor to track a number of losing plays of a grid-based game during a gaming session, where the grid-based game being arranged as an array of cells to be populated with symbols for plays of the grid-based game, generate a prompt for a player of the grid-based game to reuse a wild symbol, that appears in one play of the number of losing plays, in a next play when the number of losing plays exceeds a threshold, receive input from the player to reuse the wild symbol in the next play, generate, in response to the input, a sequence of symbols comprising the wild symbol, and cause the display to display the sequence of symbols populated to the array of cells with the wild symbol appearing in a cell position in the array of cells that matches a cell position of where the wild symbol appeared in the one play.

Additional features and advantages are described herein and will be apparent from the following Description and the figures.

DETAILED DESCRIPTION

Embodiments of the present disclosure will be described in connection with gaming systems having one or multiple gaming devices that are capable of providing reusable wild symbol operations in a grid-based game. The reusable wild symbol operations allow a player of the gaming device to reuse particular would symbol that occurred for a previous play (e.g., a losing play) of the grid-based game. The gaming devices may comprise a computational device, such as a slot machine or Electronic Gaming Machine (EGM). While embodiments of the present disclosure will be described in connection with the example of a slot machine, or EGM implementing reusable wild symbol operations, it should be appreciated that embodiments of the present disclosure are not so limited. For instance, other types of computational devices, such as portable user devices, smartphones, tablets, laptops, Personal Computers (PCs), wearable devices, etc. may be used to implement game enhancement features as part of a game as described herein. Furthermore, it should be appreciated that embodiments of the present disclosure may apply to games other than slot games. For instance, embodiments of the present disclosure may be used in connection with any type of grid-based game such as bingo, keno, slots, matching games, table games, etc.

In at least one embodiment, when a player loses a specified number of bets (e.g., three bets) of the same bet level in a row, the player is able to activate a feature, for example, by pressing a button on the screen that becomes active. Activating the feature will take any predetermined symbol(s) (e.g., wilds or wild symbols) that have landed in the specified number of losing spins and apply those predetermined symbol(s) to the same positions (or different positions) for the next spin. In at least one embodiment where the predetermined symbol(s) include wilds, the player may choose to hold the wilds. For example, if the player loses three plays in a row, the player could hold the wilds for up to a specific number of losses (e.g., up to then losses in a row) and then use all or some of the wilds stored from the losses. However, if the player experiences a win between any losses, the feature for reusing a wild is inactivated until the player again experiences the specified number of losses in a row (e.g., three losses in a row) to reactivate the feature.

Among other things, embodiments of the present disclosure may provide a player with more ways to win a game, the ability to alter the chances of winning in a game, the ability to alter the payout amount for a winning game outcome, and add excitement to the overall game-playing experience of games.

Figure 1A:
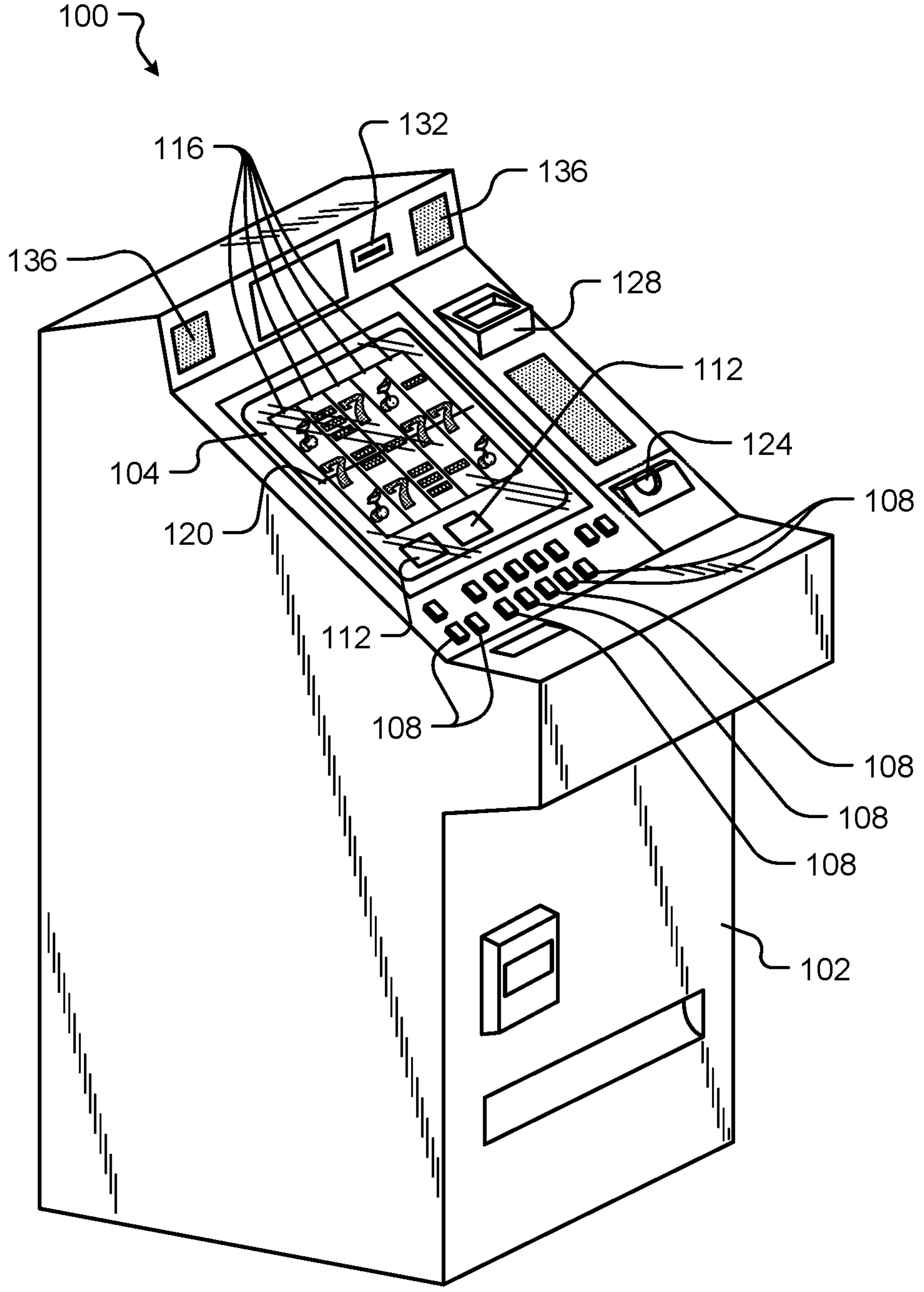
FIG. 1A depicts one example of a computational gaming device for enabling enhanced gaming features and reusable wild symbol operations.
Figure 1B:
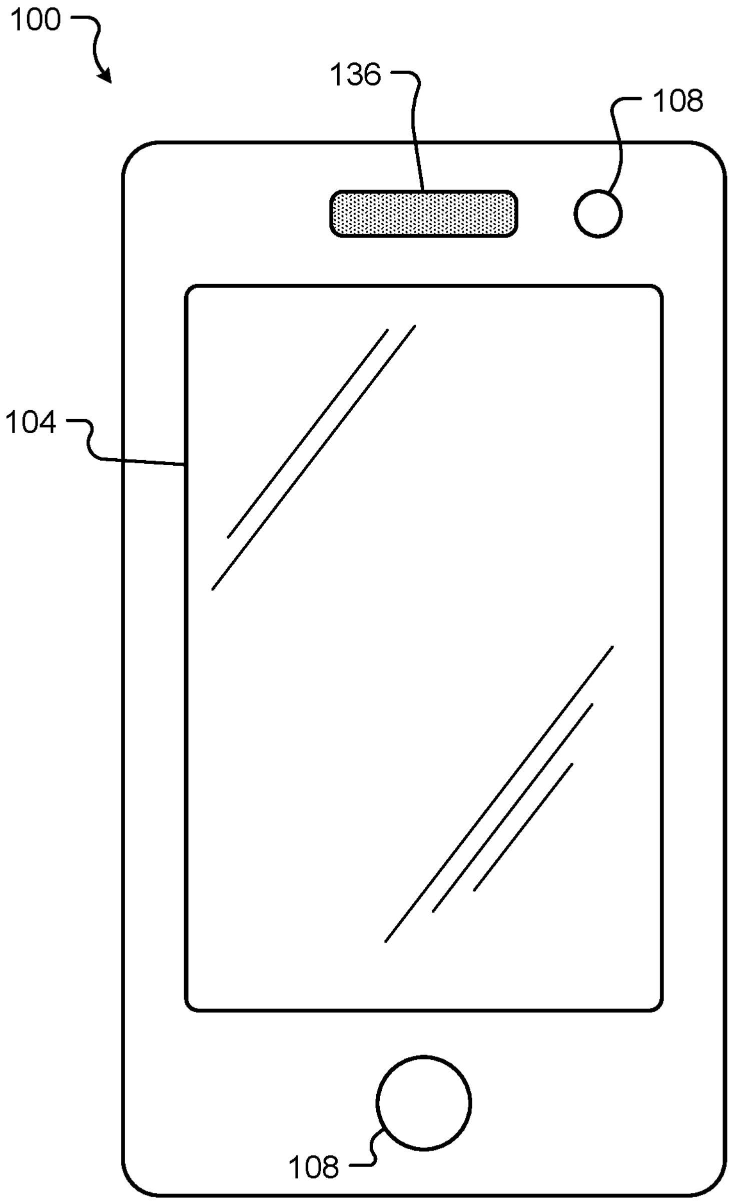
FIG. 1B depicts another example of a computational gaming device for enabling enhanced gaming features and reusable wild symbol operations.

FIGS. 1A and 1B show an illustrative computational device 100 that may be used to implement a grid-based game in accordance with at least some embodiments of the present disclosure. A computational device 100 may include a portable or non-portable device used for executing a gaming application or multiple different gaming applications without departing from the scope of the present disclosure. Non-limiting examples of a computational device include an EGM, a Video Gaming Machine (VGM), a mobile communication device (e.g., a smartphone, laptop, tablet, wearable device, etc.), a personal computer (PC), etc. An EGM or VGM-type of computational device 100 is shown in FIG. 1A in accordance with embodiments of the present disclosure.

The illustrative computational device 100 of FIG. 1A is shown to include a support structure, housing or cabinet, 102 which provides support for a plurality of displays, inputs, controls and other features of a conventional gaming machine. In the illustrated embodiment, a player plays the computational device 100 while sitting, however, the computational device 100 is alternatively configured so that a player can operate it while standing or sitting. The illustrated computational device 100 is positioned on the floor but can be positioned alternatively (i) on a base or stand, (ii) as a pub-style table-top game (e.g., where the participant computational devices are located remotely from the shared wheel as discussed below), (iii) as a stand-alone computational device on the floor of a casino with other stand-alone computational devices, or (iv) in any other suitable manner. The computational device 100 can be constructed with varying cabinet and display configurations.

In one embodiment, a computational device 100 is configured to randomly generate awards and/or other game outcomes based on probability data. Since a computational device 100 generates outcomes randomly or based upon a probability calculation, there is no certainty that the computational device 100 will provide the player with any specific award or other game outcome.

In some embodiments, a computational device 100 may employ a predetermined or finite set or pool of awards, progressive awards, prizes or other game outcomes. As each award or other game outcome is provided to the player, the computational device 100 removes the provided award or other game outcome from the predetermined set or pool. Once removed from the set or pool, the specific provided award or other game outcome cannot be provided to the player again. The computational device 100 provides players with all of the available awards or other game outcomes over the course of the play cycle and may guarantee a designated number of actual wins and losses.

The computational device 100 may include one or more displays 112. An illustrative display 112 may include a credit display that displays a player's current number of credits, cash, account balance or the equivalent. Another illustrative display 112 may include a bet display that displays a player's amount wagered.

The computational device 100 is also shown to include at least one payment acceptor. Illustrative payment acceptors may include, without limitation, a coin slot 124, where the player inserts coins or tokens, and a ticket, note, or bill acceptor 128, where the player inserts a bar-coded ticket, note, or cash. In one embodiment, a player-tracking card, credit card, debit card, or data card reader/validator 132 is also provided for accepting any of those or other types of cards as a form of payment toward playing a game on the computational device 100.

In one embodiment, a player inserts an identification card into card reader 132 of computational device 100. The identification card can be a smart card having a programmed microchip or a magnetic strip coded with a player's identification, credit totals, and other relevant information. In one embodiment, money may be transferred to computational device 100 through an electronic fund transfer and card reader 132 using the player's credit, debit, or smart card. When a player funds the computational device 100, a processor of the computational device 100 may determine the amount of funds entered and the corresponding amount is shown on the credit or other suitable display 112 as described above.

In one embodiment, after appropriate funding of computational device 100, the player presses an input device 108 to initiate game play. The input devices 108 may include various types of buttons, levers, gesture inputs, cameras, etc., that enable a player to start any game play or sequence of events. In one embodiment, upon appropriate funding, computational device 100 begins game play automatically. In another embodiment, the player needs to actuate or activate one of the play buttons to initiate play of computational device 100. Other non-limiting types of input devices 108 may include a "bet one" button, a "max bet" button, or any other type of button known to be included in an EGM, VGM, or the like. It should further be appreciated that the input devices 108 may correspond to a physical button, a virtual button on a touch-screen of a game, an input element on a Graphical User Interface (GUI), or a combination thereof. In other words, the input devices 108 do not need to correspond to a physical button. In some embodiments, the player places a bet by pushing a "bet one" button (e.g., betting an amount equal to one credit for the next play). The player may increase the player's wager by one credit each time the player pushes "bet one" button. When the player pushes the "bet one" button, the number of credits shown in the credit display decreases by one, and the number of credits shown in the bet display increases by one. A "max bet" button can also be provided, which enables the player to bet the maximum wager (e.g., max lines, max wager per line, and re-spin operation). The computational device 100 may include other suitable wager buttons, such as a "repeat bet" button (e.g., repeating the bet made from the immediately previous play of the computational device 100 for the next play of the computational device 100), one or more "select paylines" buttons, a "select re-spin operation" button, and one or more "select wager per payline" buttons.

Another type of input device 108 that may be provided on the computational device 100 is a physical cash out button, a virtual cash out button, a selectable GUI element, or the like. The player presses a cash out button and cashes-out to receive a cash payment or other suitable form of payment corresponding to the number of remaining credits. The player can receive coins or tokens in a coin payout tray or a ticket or credit slip, which are redeemable by a cashier or funded to the player's electronically-recordable identification card.

The computational device 100 may also include one or more display screens 104 and one or more sound generating devices 136. The combination of outputs provided on a display screen 104 and sound generating device 136 may contribute to the game play experience and, in some embodiments, may provide the player with information regarding a status of a game play event or sequence of events.

In one embodiment, the sound generating device 136 may include at least one speaker or other type of transducer for generating audible sounds, playing music, etc. In one embodiment, a computational device 100 provides dynamic sounds coupled with attractive multimedia images displayed on the display screen 104 to provide an audio-visual representation or to otherwise display full-motion video with sound to attract players to the computational device 100. During idle periods, the computational device 100 displays a sequence of audio and/or visual attraction messages to attract potential players to the computational device 100.

In one embodiment, a base or primary grid-based game includes a slot game with one or more paylines 120. As will be discussed in further detail herein, the grid-based game provided by the computational device 100 may support one or multiple paylines 120, which may extend across the display screen 104 vertically, horizontally, diagonally, at adjusted angles, etc. In some embodiments, such as for a slot game, a payline 120 intersects a plurality of reels 116, such as three to five reels. Each reel 116 of the display screen 104 may be used to display different sets of symbols in connection with game play activity provided by the computational device 100. In some embodiments, each reel 116 may operate independent of all other reels and the symbols displayed by a reel 116 at the end of a given spin may depend upon random numbers generated by the computational device 100. The positions of symbols on each reel 116 and in the combination of reels 116 may form an array of cells in a presentation order rendered to the display screen 104 of the computational device 100.

The reels 116 may be provided in video form with simulated reels being displayed via the display screen 104. A reel 116 may be used to display any number of symbols such as bells, hearts, fruits, numbers, letters, bars or other images and symbols, which may correspond to a theme associated with a game provided by the computational device 100. With a slot game, the computational device 100 may be configured to award prizes, awards, or other game play opportunities when the reels 116 stop spinning and a predetermined symbol combination lands across an active payline 120 (e.g., a payline 120 that is currently being wagered and is subject to evaluation for a win after the reels 116 have stopped spinning).

In at least one embodiment, each reel 116 is a mechanical reel that includes one or more mechanisms that mechanically cause each reel 116 to spin.

FIG. 1B illustrates another example of a computational device 100 in accordance with at least some embodiments of the present disclosure. This particular example of computational device 100 may correspond to a portable computational device 100 such as a mobile smartphone, tablet, wearable, etc. The computational device 100 may be owned by a user of the device 100 rather than being owned by a casino operator.

The computational device 100 again includes a display screen 104, a plurality of input devices 108, and at least one speaker 136. In some embodiments, the display screen 104 may correspond to a touch-sensitive display screen, meaning that the display screen 104 is simultaneously capable of displaying information (e.g., in connection with game play activity) and receiving a user input. In some embodiments, the touch-sensitive display screen 104 may provide game features similar to a cabinet-style computational device 100 without requiring all of the dedicated buttons provided by a cabinet-style computational device 100.

Figure 2:
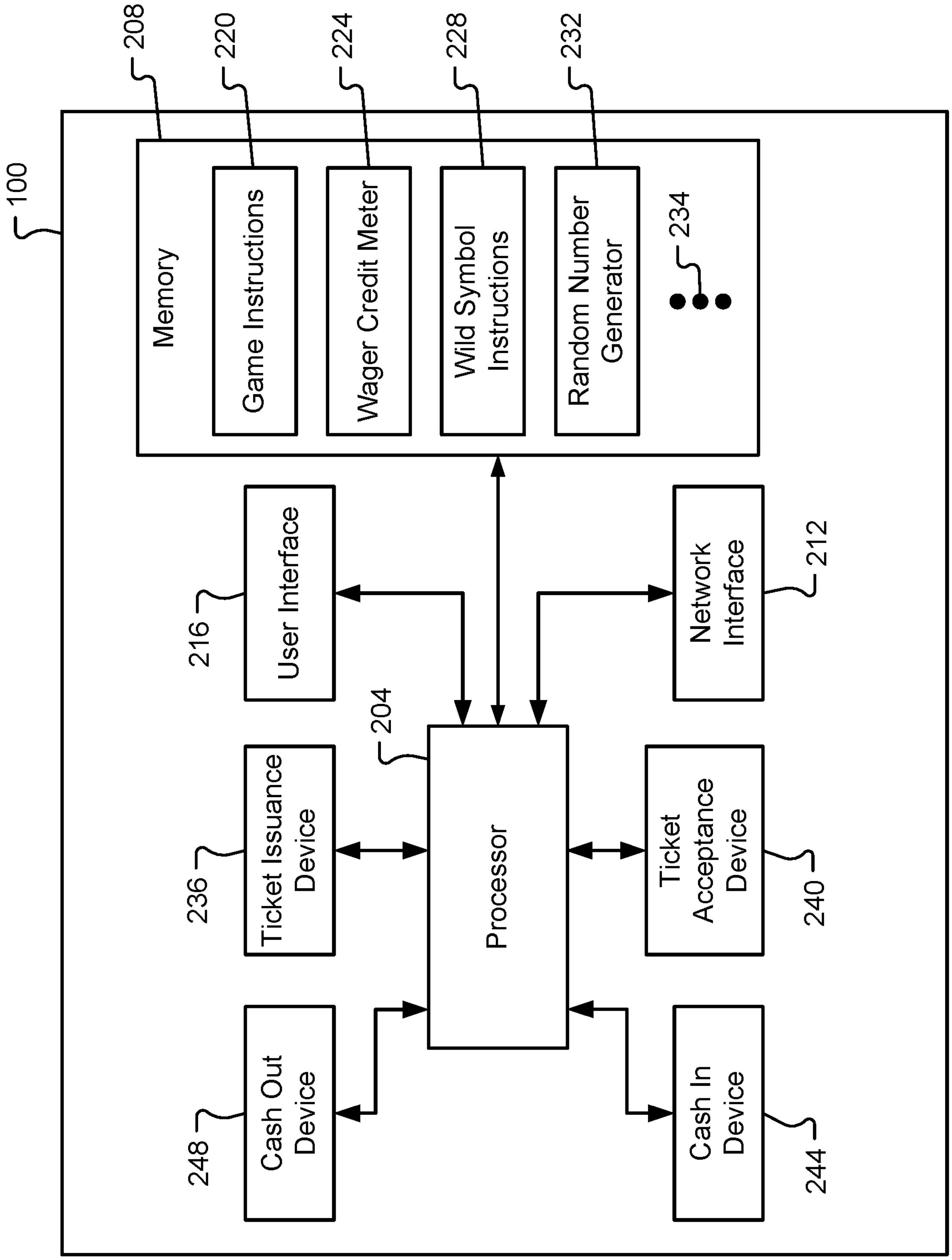
FIG. 2 is a block diagram depicting components of a computational gaming device for enabling enhanced gaming features and reusable wild symbol operations.

With reference now to FIG. 2, additional details of the components that may be included in a computational device 100 will be described in accordance with at least some embodiments of the present disclosure. The computational device 100 is shown to include a processor 204, memory 208, a network interface 212, and a user interface 216. In some embodiments, the processor 204 may correspond to one or many microprocessors, Central Processing Units (CPUs), microcontrollers, Integrated Circuit (IC) chips, or the like. The processor 204 may be configured to execute one or more instruction sets stored in memory 208. In some embodiments, the instruction sets stored in memory 208, when executed by the processor 204, may enable the computational device 100 to provide game play functionality.

The nature of the network interface 212 may depend upon whether the network interface 212 is provided in cabinet-style computational device 100 or a mobile computational device 100. Examples of a suitable network interface 212 include, without limitation, an Ethernet port, a Universal Serial Bus (USB) port, an RS-232 port, an RS-485 port, a network interface controller (NIC), an antenna, a driver circuit, a modulator/demodulator, etc. The network interface 212 may include one or multiple different network interfaces depending upon whether the computational device 100 is connecting to a single communication network or multiple different types of communication networks. For instance, the computational device 100 may be provided with both a wired network interface 212 and a wireless network interface 212 without departing from the scope of the present disclosure.

The user interface 216 may include a combination of the user input and user outputs described in connection with FIGS. 1A and 1B. For instance, the user interface 216 may include the display screen 104, the input devices 108, the speakers 136, or any other component that is capable of enabling user interaction with the computational device 100. The user interface 216 may also include one or more drivers for the various hardware components that enable user interaction with the computational device 100.

The memory 208 may include one or multiple computer memory devices that are volatile or non-volatile. The memory 208 may be configured to store instruction sets that enable player interaction with the computational device 100 and that enable game play at the computational device 100. Examples of instruction sets that may be stored in the memory 208 include a game instruction set 220, a credit meter 224, and a wild symbol instruction set 228. In addition to the instruction sets, the memory 208 may also include a random number generator 232 that is used by the game instruction set 220, for example, to provide game outputs (e.g., partially random or completely random sequences of symbols).

In some embodiments, the game instruction set 220, when executed by the processor 204, may enable the computational device 100 to facilitate one or more games of chance or skill and produce interactions between the player and the game of chance or skill. In some embodiments, the game instruction set 220 may include subroutines that present one or more graphics to the player via the user interface 216, subroutines that calculate whether a particular wager has resulted in a win or loss during the game of chance or skill, subroutines for determining payouts for the player in the event of a win, subroutines for exchanging communications with another device, such as a server, subroutines for determining random wild symbol appearances during game play, and any other subroutine useful in connection with facilitating game play at the computational device 100.

In some embodiments, the game instruction set 220 may include instructions that initiate a reel spin at the various reels 116 in connection with game play. In some embodiments, the random number generator 232 is used to determine a final position of the reels 116 after the spin is completed. The game instruction set 220 may also be configured to present symbols via the display screen 104 when the reels 116 correspond to video reels or the like. The game instruction set 220 may also be configured to evaluate a position of symbols relative to one or more paylines 120, relative to predetermined symbol areas, or cells in an array of cells, and any other evaluation desired to facilitate game play.

The credit meter 224 may correspond to an instruction set within the computational device 100 that facilitates a tracking of wager activity at the computational device 100. In some embodiments, the credit meter 224 may be used to store or log information related to various player activities and events that occur at the computational device 100. The types of information that may be maintained in the credit meter 224 include, without limitation, player information, available credit information, wager amount information, and other types of information that may or may not need to be recorded for purposes of accounting for wagers placed at the computational device 100 and payouts made for a player during a game of chance or skill played at the computational device 100.

In some embodiments, the credit meter 224 may be configured to track coin in activity, coin out activity, coin drop activity, jackpot paid activity, credits applied activity, external bonus payout activity, voucher in activity, voucher out activity, timing of events that occur at the computational device 100, and the like. In some embodiments, certain portions of the credit meter 224 may be updated in response to outcomes of a game of chance or skill played at the computational device 100.

The wild symbol instruction set 228 may correspond to a subroutine that is called by the game instruction set 220 during game play. In some embodiments, the wild symbol instruction set 228 may be called by the game instruction set 220 when the game instruction set determines that a wild symbol operation is available and/or that a particular symbol in the array of cells is a wild symbol. In general, a wild symbol or wild may be any symbol that is beneficial to the player. For example, a wild symbol may be a symbol that results in a payout, an increased payout, or other improved game outcome. In at least one example, a wild symbol may be a symbol that "fills in" for any other symbol in the game. In some examples, a wild symbol refers to a symbol that is used with any other symbol to create one or more winning combinations of symbols. In at least one example, a wild symbol may be replaced with a number of different symbols in a single evaluation of a play of the game to benefit the player or improve the outcome of the game. In some embodiments, the wild symbol instruction set 228 is configured, when executed by the processor 204, to track a number of consecutive losing plays or spins of the grid-based game, generate and store a pointer to all or some of the wild symbols that appears in the losing plays, and provide a player with an option to reuse one or more of the wild symbols that appeared in the losing plays in an additional play or spin. The option may be provided after a number of consecutive losing plays or spins exceeds a threshold (e.g., three losing plays). The additional play or spin may be the next play or spin that immediately follows the play in which the player was provided with the option to reuse the one or more wild symbols. The option to reuse the one or more wild symbols may be presented to the player on the user interface 216 for the additional play and for each subsequent losing play until the player achieves a winning combination of symbols.

The wild symbol instruction set 228 may further receive player input that confirms the player would like to reuse the one or more wild symbols in the additional play or spin. The wild symbol instruction set 228 may access or retrieve a respective pointer for each wild symbol to be reused and determine a cell position of where each wild symbol will appear in array of cells of the grid-based game for the additional play based on the respective pointer. In at least one embodiment for the additional play, a reused wild symbol appears in a same cell position within the array of cells as where that wild symbol appeared for a previous losing play. In this case, the pointer of the reused wild symbol points to the cell position where that wild symbol appeared for the previous losing play.

In at least one embodiment for the additional play, the reused wild symbol appears in a different cell position within the array of cells compared to where that wild symbol appeared in a previous losing play. The different cell position may be automatically selected based on the respective pointer, selected based on input by the player, or a combination thereof. For example, the processor 204 may execute the wild symbol instructions 228 to determine multiple possible cell positions, where one of the multiple possible cell positions is selected as the different cell position by the player or automatically selected as the different cell position by the processor 204. In this case, each possible cell position may be determined by the processor 204 to have little to no effect on the odds of the player achieving a winning combination of symbols in the additional play. In one example, the processor 204 executes the wild symbol instructions 228 to, before proceeding with the additional play, display a wild symbol to be reused and the possible cell positions of where the reused wild symbol can appear in the additional play. The player may then be provided with the option to select one of the possible cell positions for the reused wild symbol in the additional play by, for example, "dragging and dropping" the reusable wild symbol on one of the possible cell positions or otherwise indicating the player's preference for where the reused wild symbol will appear in the additional play. A pointer for the different cell position may be stored to continue to provide the player with the option to reuse that wild symbol in the different cell position for each play after the additional play until the player achieves a winning combination of symbols. Upon achieving a winning combination of symbols, the pointer(s) for the reusable wild symbol(s) is/are) discarded (e.g., erased from memory) and the threshold for the number of consecutive losing plays is reset.

Whether the cell position of the reused wild symbol for the additional play is selected to be the same as or different from the reused wild symbol's cell position in a previous losing play, the wild symbol instruction set 228 may inform the game instruction set 220 to lock the reused wild symbol in the selected cell position for the additional play. The game instruction set 220 can then implement the additional play (e.g., a re-spin operation with random symbols other than the reused wild symbol) while maintaining the reused wild symbol in the selected cell position. The cooperation of the game instruction set 220 and wild symbol instruction set 228 may increase the desirability of the overall gaming experience and that gives a player the sense of control over the grid-based game that may increase their desire to continue playing the grid-based game.

While shown as separate instruction sets, it should be appreciated that the wild symbol instruction set 228 may correspond to a subroutine of the game instruction set 220 without departing from the scope of the present disclosure. Additional details and functional capabilities of the wild symbol instruction set 228 working in cooperation with the game instruction set 220 will be described in connection with FIGS. 3-6.

The computational device 100 is further shown to include a ticket issuance device 236, a ticket acceptance device 240, a cash in device 244, and a cash out device 238. The ticket issuance device 236 may be configured to receive physical tickets, vouchers, or player loyalty cards. In some embodiments, the ticket issuance device 236 and ticket acceptance device 240 may operate in concert with the ticket acceptor 128. In such an embodiment, the ticket acceptor 128 may correspond to the physical components that receive and issue a ticket or voucher whereas the ticket issuance device 236 and the ticket acceptance device 240 correspond to the drivers and/or firmware components that control operation of the ticket acceptor 128. It should also be appreciated that the card reader 132 may be in communication with the ticket issuance device 236 and the ticket acceptance device 140 and may have functionality driven by one or both of these devices. For instance, the card reader 132 may correspond to the physical hardware components that receive information from a player loyalty card (or player loyalty application running on a mobile communication device, etc.) and that information may be processed by the ticket acceptance device 240 when receiving player credits from cards read by the card reader 132. The ticket issuance device 236 may provide the card reader 132 with information for applying wager credits back to a player card when a player is done with a game play session and wishes to transfer credits from the credit meter 224 back onto their card. Thus, the ticket issuance device 236 and ticket acceptance device 240 may also operate as a driver and/or firmware component for the card reader 132.

Similarly, the cash in device 244 and cash out device 248 may include or operate in concert with the coin slot 124 and any coin delivery mechanisms. The cash in device 244 and cash out device 248 may include hardware, drivers, or firmware that facilitate receiving or distributing cash, tokens, bills, etc. In some embodiments, the cash in device 244 may be configured to determine an amount of cash (e.g., in coins, bills, etc.), an amount or number of tokens, etc., input at the coin slot 124 and convert the values into credits for playing games with the game instruction set 220. The cash out device 248 may correspond to hardware and software configured to output coins, tokens, bills, etc. if a player decides to cash out or convert playing credits back into cash, tokens, bills, etc.

Figure 3:
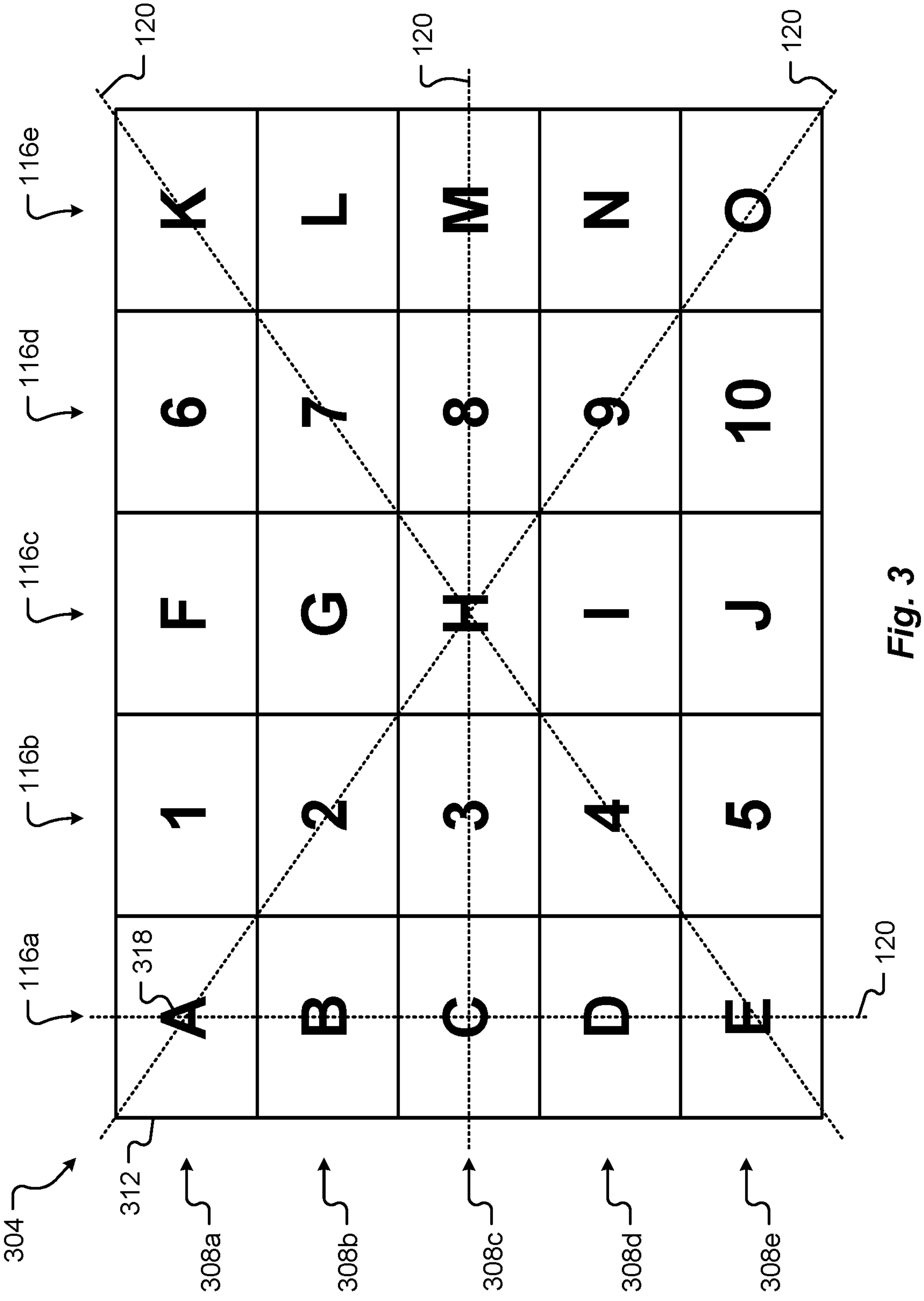
FIG. 3 is an illustrative layout of symbols rendered to an array of cells of a grid-based game.

With reference now to FIGS. 3 to 6, various operations of the game instruction set 220 and the wild symbol instruction set 228 will be described in accordance with at least some embodiments of the present disclosure. FIG. 3 illustrates a first layout of symbols 318 rendered to an array of cells 304 of a grid-based game in accordance with embodiments of the present disclosure. The array of cells 304 may be presented, or otherwise rendered, with the display screen 104. In some embodiments, the game instruction set 220 may control which symbols 318 are presented within a particular cell 312 in the array of cells 304. The illustrative array of cells 304 is shown to include five columns **116*a*, 116*b*, 116*c*, 116*d*, 116*e* of cells 312 and five rows 308*a*, 308*b*, 308*c*, 308*d*, 308*e* of cells 312. Although FIG. 3 illustrates a 5×5 array of cells 304, it should be appreciated that embodiments of the present disclosure can be implemented in an array of cells 304 having a variety of sizes. For instance, embodiments of the present disclosure may be used in an array of cells 304 that are 3×3, 3×5, 5×3, 7×3, 10×5, 10×10, etc. The example layout of the array of cells 304** should not be construed as limiting embodiments of the present disclosure.

As can be seen in FIG. 3, each cell 312 in the array of cells 304 may be populated with a single symbol 318. In other words, after the game instruction set 220 has applied the random number generator 232 to determine symbol 318 placement throughout the array of cells 304, there is a 1:1 correlation of symbols 318 to cells 312. Each column **116*a*, 116*b*, 116*c*, 116*d*, 116*e* may also be referred to as a reel 116, particularly in the event that the game instruction set 220 provides a slot game. If a slot game is implemented, then the reels 116 (e.g., in video form) are spun (e.g., virtually) and their final position after the spin is determined, at least in part, with assistance of the random number generator 232. In some embodiments, a symbol 318 may correspond to an absence of a symbol or a blank symbol. This blank symbol may correspond to a symbol in a cell 312** having no value.

In some embodiments, payouts or other predetermined game outcomes (e.g., bonus spin opportunities, prize wins, cash wins, re-spin bonus plays, etc.) may be determined based on a symbol combination that falls on a payline 120 that was subject to a wager prior to the spin. In some embodiments, a plurality of the paylines 120 may be selected for "play" prior to a spin, meaning that any payline 120 selected for "play" will be evaluated for a predetermined symbol combination, or sequence of symbols 318. Examples of a sequence of symbols 318 may include, but are in no way limited to, at least one of the sequence [A; 1; F; 6; K] associated with the first row 308*a*, the sequence [B; 2; G; 7; L] associated with the second row 308*b*, the sequence [C; 3; H; 8; M] associated with the third row 308*c*, the sequence [D; 4; I; 9; N] associated with the fourth row 308*d*, the sequence [E; 5; J; 10; O] associated with the fifth row 308*e*, and/or reverse sequences of the same.

Additionally or alternatively, the sequence of symbols 318 may include, but are in no way limited to, a sequence of symbols 318 in an order along one or more of the vertical lines of cells 312 associated with the columns 116*a*-116*e* (e.g., the sequence [A; B; C; D; E], the sequence [1; 2; 3; 4; 5], etc., and/or reverse sequences of the same). In some embodiments, the sequence of symbols 318 may include, but are in no way limited to, a sequence of symbols 318 in an order along one or more of the cells 312 having a payline 120 running therethrough (e.g., the first diagonal payline sequence [A; 2; H; 9; O], the second diagonal payline sequence [E; 4; H; 7; K], the first vertical payline sequence [A; B; C; D; E], the first horizontal payline sequence [C; 3; H; 8; M], etc., and/or reverse sequences of the same). In one embodiment, the sequence of symbols may comprise all sequences of symbols associated with each row 308*a*-308*e* and/or column 116*a*-116*e*.

A selected pay line 120 may also correspond to the payline 120 that is evaluated after symbols 318 have been subjected to a wild symbol operation by the wild symbol instruction set 228. In some embodiments, however, it may be possible to switch or select more paylines 120 for evaluation after a spin has completed, but before a subsequent play operation (e.g., an additional play, a re-spin, etc.) has been performed. The addition of more paylines 120 after the original spin but prior to the subsequent play operation may require the user to provide more credits to the game instruction set 220 as part of enabling evaluation over more paylines 120. Although shown having four different linear paylines 120 (e.g., horizontal, vertical, diagonal, etc.), one or more paylines 120 may be associated with cells 312 in any shape the array of cells 304. In one embodiment, a payline 120 may run through a single row 308*a*-308*e* of the array of cells 304 (e.g., first row 308*a*, etc.). In some embodiments, a pay line 120 may run through one or more columns 116*a*-116*e* in the array of cells 304. In any event, embodiments of the present disclosure are not limited to the position and/or shape of the paylines 120 shown in FIGS. 3-5B.

Referring now to FIGS. 4A-4H, an illustrative game play sequence that can be performed by the game instruction set 220 and the wild symbol instruction set 228 will be described in accordance with at least some embodiments of the present disclosure. In some embodiments, FIGS. 4A-4H illustrate various presentations that are caused to be rendered by a display screen 104 of a computational device 100.

Figure 4A:
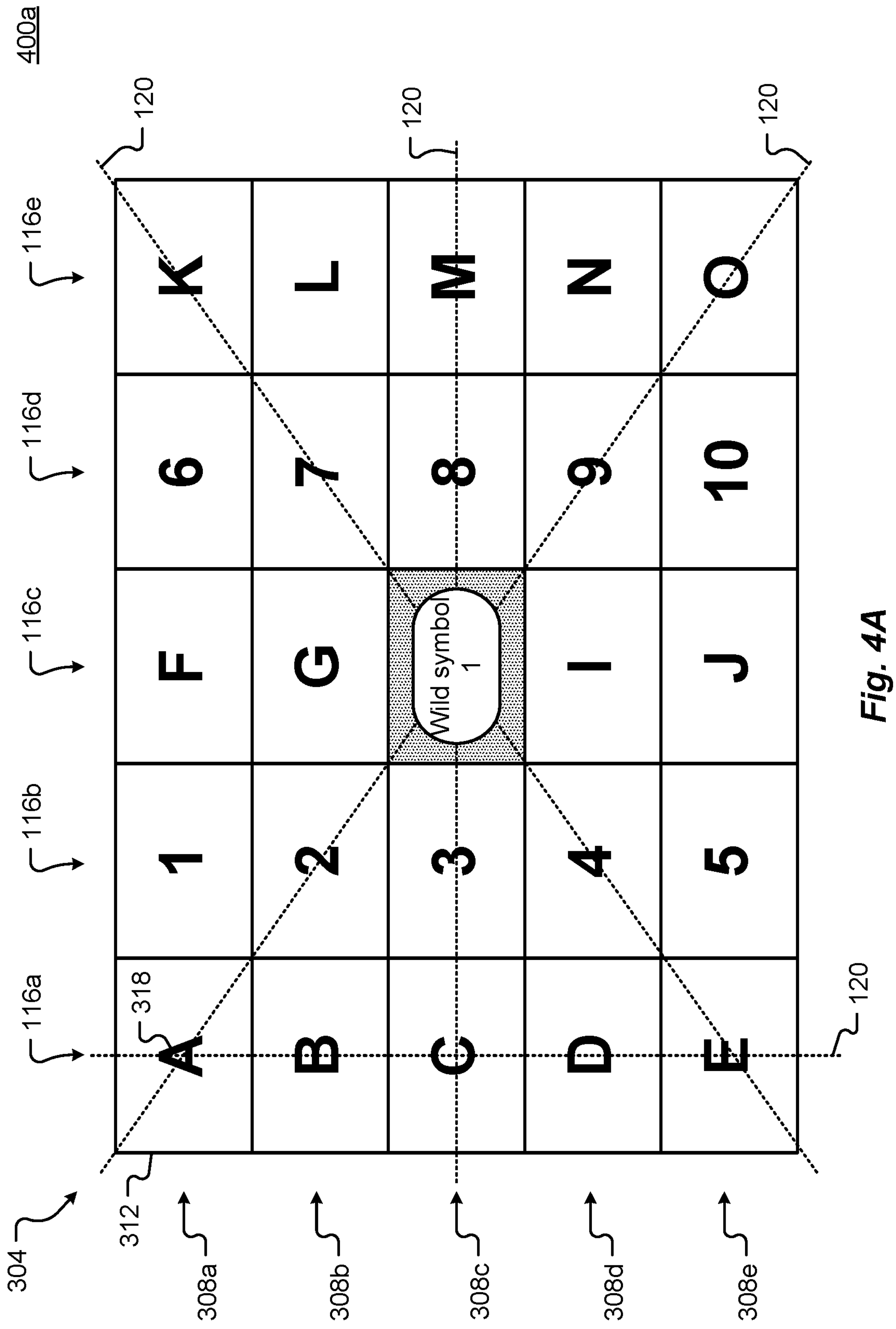
FIG. 4A illustrates a first output of the computational gaming device showing a first sequence of symbols comprising a wild symbol in the array of cells that are rendered for a first losing play of the grid-based game.

In the example of FIG. 4A, a wild symbol is shown to have landed in a cell position 312 for a first play 400*a* of the grid-based game. Specifically, the wild symbol is shown to have landed in the cell position 312 that resides at the intersection of the third row 308*c* and the third column 116*c*. The original play, or spin, and placement of symbols 318 throughout the array of cells 304 may have been determined by the game instruction set 220 working in cooperation with the random number generator 232. Stated another way, each cell 312 in the array of cells 304 is populated with a respective discrete symbol 318 that is rendered by the display screen 104 of the computational device 100. The symbols 318 may be randomly assigned to each cell 312 in the array of cells 304 in accordance with output of the random number generator 232.

The cell positions of symbols 318 in the array of cells 304 may be evaluated by the game instruction set 220 to determine if a predetermined game outcome has occurred (e.g., a wager has resulted in a win or prize). For instance, the game instruction set 220 may determine if a sequence of symbols 318 along a payline 120 corresponds to a winning game outcome. The sequence of symbols 318 may correspond to an order of symbols 318 in a particular sequence as defined by the rules of the game. In one embodiment, a winning outcome for a sequence of symbols 318 may require at least one of a first symbol to appear in the first column 116*a* of a payline 120, a second symbol to appear in the second column 116*b* of the same payline 120, a third symbol to appear in the third column 116*c* of the same payline 120, a fourth symbol to appear in the fourth column 116*d* of the same payline 120, and a fifth symbol to appear in the fifth column 116*e* of the same payline. Depending on the rules of the game, these symbols 318 may be required to be the same, for example, forming a match between two or more cells 312 in the sequence of symbols 318.

In FIG. 4A, the game instruction set 220 and/or the wild symbol instruction set 228 in conjunction with the random number generator 232 randomly generated a wild symbol 1 associated with a particular symbol 318 in the cell 312 at the intersection of the third row 308*c* and the third column 116*c*. In some embodiments, the wild symbol 1 may be made available in response to a previous game play, a wager amount, a historical game play, etc. The placement and position, or cell 312, associated with the wild symbol 1 in the array of cells 304 may be randomly determined for the first play 400*a* (e.g., via the game instruction set 220 and/or the wild symbol instruction set 228 being executed by the processor 204 in conjunction with the random number generator 232). As noted above, the wild symbol 1 may correspond to a symbol that can be used with any other symbol to achieve a winning pay line 120. In one embodiment, the wild symbol 1 may correspond to a bonus symbol type, a high-probability winning symbol type (e.g., cherries, diamonds, multipliers, etc.), and/or some other symbol that may increase the player's chances of winning on a subsequent play where the wild symbol 1 appears in a particular cell 312 in the array of cells 304.

The play 400*a* in FIG. 4A may correspond to a losing play in that the sequences of symbols along the pay lines 120 do not correspond with a predetermined game outcome that awards the player based on a wager applied to the pay lines 120 (i.e., the play 400*a* does not include a winning combination of symbols along any pay line 120). In at least one embodiment and in response to determining that the play 400*a* is a losing play, the processor 204 executes the wild symbol instructions 228 to begin tracking or counting a number of consecutive losing plays (with play 400*a* being the first play counted) and to store a pointer to the cell position that contains the wild symbol 1 in play 400*a*. The pointer may be stored to the memory 208 as a set of coordinates that identifies the cell position of the wild symbol 1 (e.g., column 116*c* and row 308*c*) in the array of cells 304 or some other indicator that identifies the cell position of the wild symbol 1 (e.g., a cell identifier that is specific to that cell).

Figure 4B:
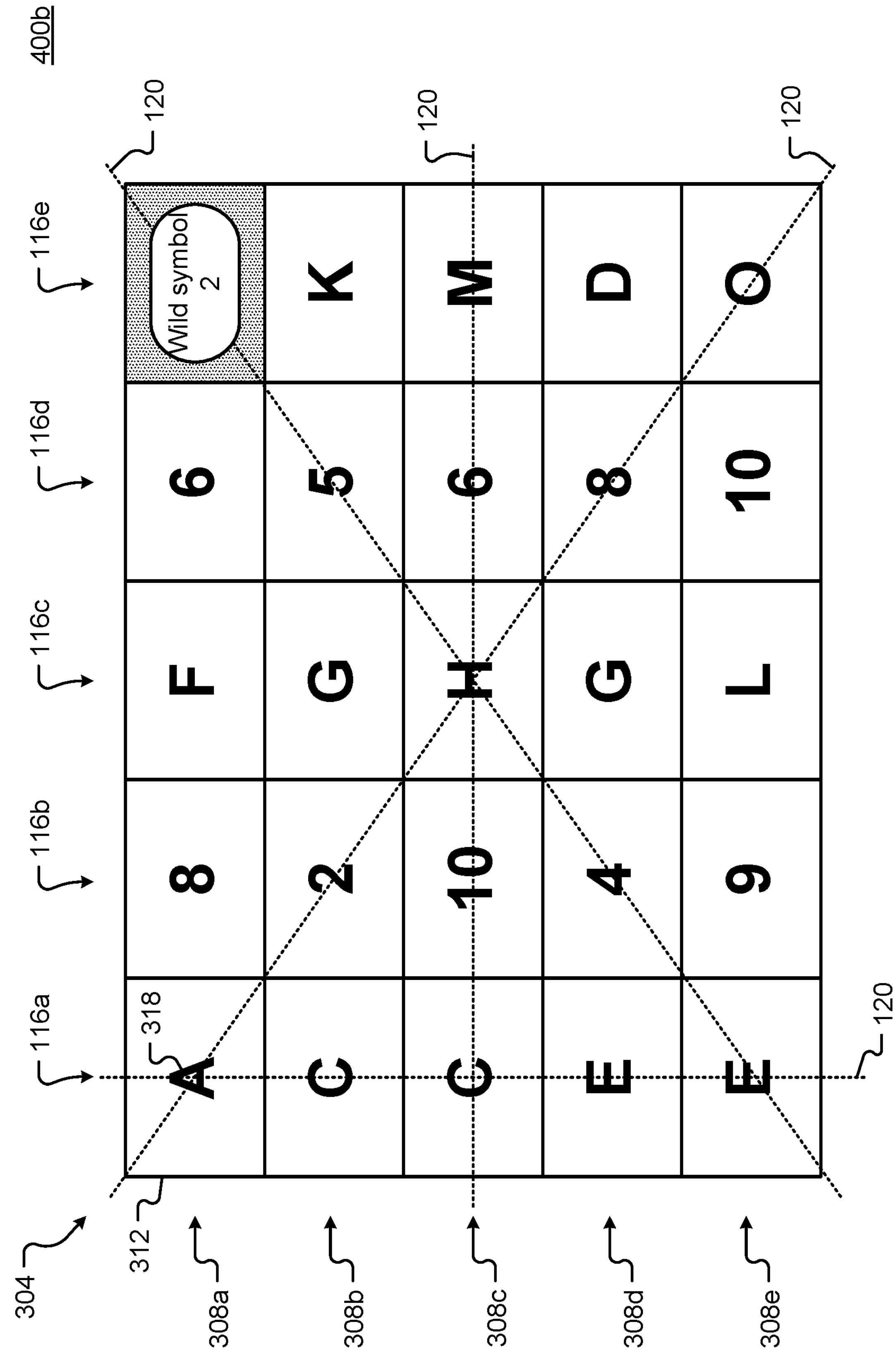
FIG. 4B illustrates a second output of the computational gaming device showing a second sequence of symbols comprising a wild symbol in the array of cells that are rendered for a second losing play of the grid-based game.

FIG. 4B illustrates a play 400*b*, which may be subsequent to (e.g., immediately subsequent to) play 400*a* in FIG. 4A. Play 400*b* generates sequences of symbols 318 in the same or similar manner as that discussed above for play 400*a*. In FIG. 4B, however, wild symbol 2 lands in a cell position that corresponds to column 116*e* and row 308*a* in the array of cells 304.

The play 400*b* may again correspond to a losing play in that the sequences of symbols along the pay lines 120 do not correspond with a predetermined game outcome that awards the player based on a wager applied to the pay lines 120 (i.e., the play 400*b* does not include a winning combination of symbols along any pay line 120). In response to determining that the play 400*b* is a losing play, the processor 204 executes the wild symbol instructions 228 to increment the number consecutive losing plays by one (now with plays 400*a* and 400*b* being counted) and to store a pointer to the cell position that contains the wild symbol 2 in play 400*b*. The pointer may be stored to the memory 208 as a set of coordinates that identifies the cell position of the wild symbol 2 (e.g., column 116*e* and row 308*a*) in the array of cells 304 or some other indicator that identifies the cell position of the wild symbol 2 (e.g., a cell identifier that is specific to that cell). Now, the memory 208 may contain two pointers, a pointer for wild symbol 1 and a pointer for wild symbol 2.

Figure 4C:
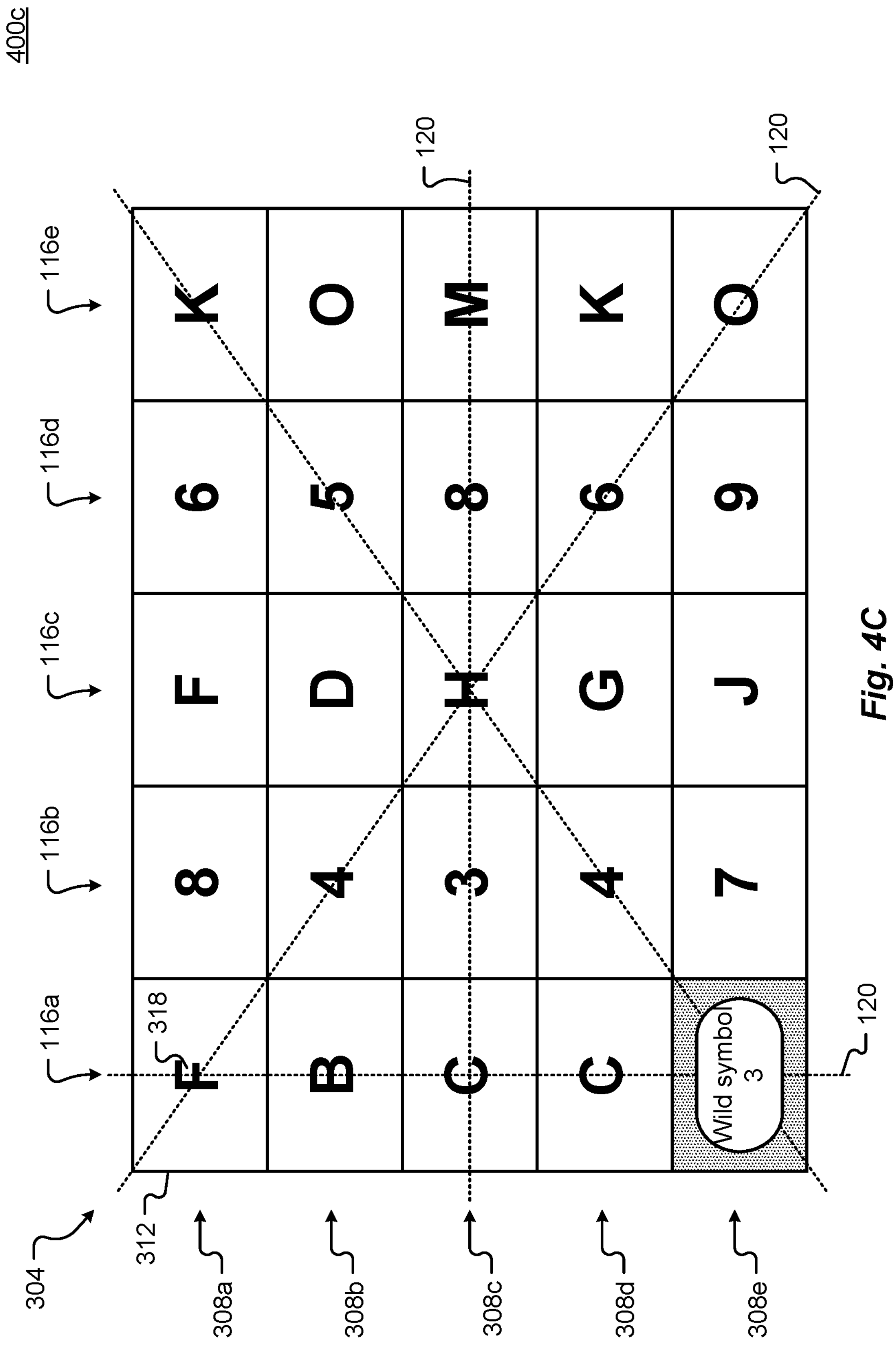
FIG. 4C illustrates a third output of the computational gaming device showing a third sequence of symbols comprising a wild symbol in the array of cells that are rendered for a third losing play of the grid-based game.

FIG. 4C illustrates a play 400*c*, which may be subsequent to (e.g., immediately subsequent to) play 400*b* in FIG. 4B. Play 400*c* generates sequences of symbols 318 in the same or similar manner as that discussed above for plays 400*a* and 400*b*. In FIG. 4C, however, wild symbol 3 lands in a cell position that corresponds to column 116*a* and row 308*e* in the array of cells 304.

The play 400*c* may again correspond to a losing play in that the sequences of symbols along the pay lines 120 do not correspond with a predetermined game outcome that awards the player based on a wager applied to the pay lines 120 (i.e., the play 400*c* does not include a winning combination of symbols along any pay line 120). In response to determining that the play 400*c* is a losing play, the processor 204 executes the wild symbol instructions 228 to increment the number consecutive losing plays by one (now with plays 400*a*, 400*b*, and 400*c* being counted as consecutive losing plays) and to store a pointer to the cell position that contains the wild symbol 3 in play 400*c*. The pointer may be stored to the memory 208 as a set of coordinates that identifies the cell position of the wild symbol 3 (e.g., column 116*e* and row 308*a*) in the array of cells 304 or some other indicator that identifies the cell position of the wild symbol 3 (e.g., a cell identifier that is specific to that cell). Now, the memory 208 may contain three pointers, a pointer for wild symbol, a pointer for wild symbol 2, and a pointer for wild symbol 3. Here, it should be appreciated that wild symbols 1, 2, and 3 may correspond to a same type of wild symbol or different types of wild symbol depending on the type of grid-based game being played.

Figure 4D:
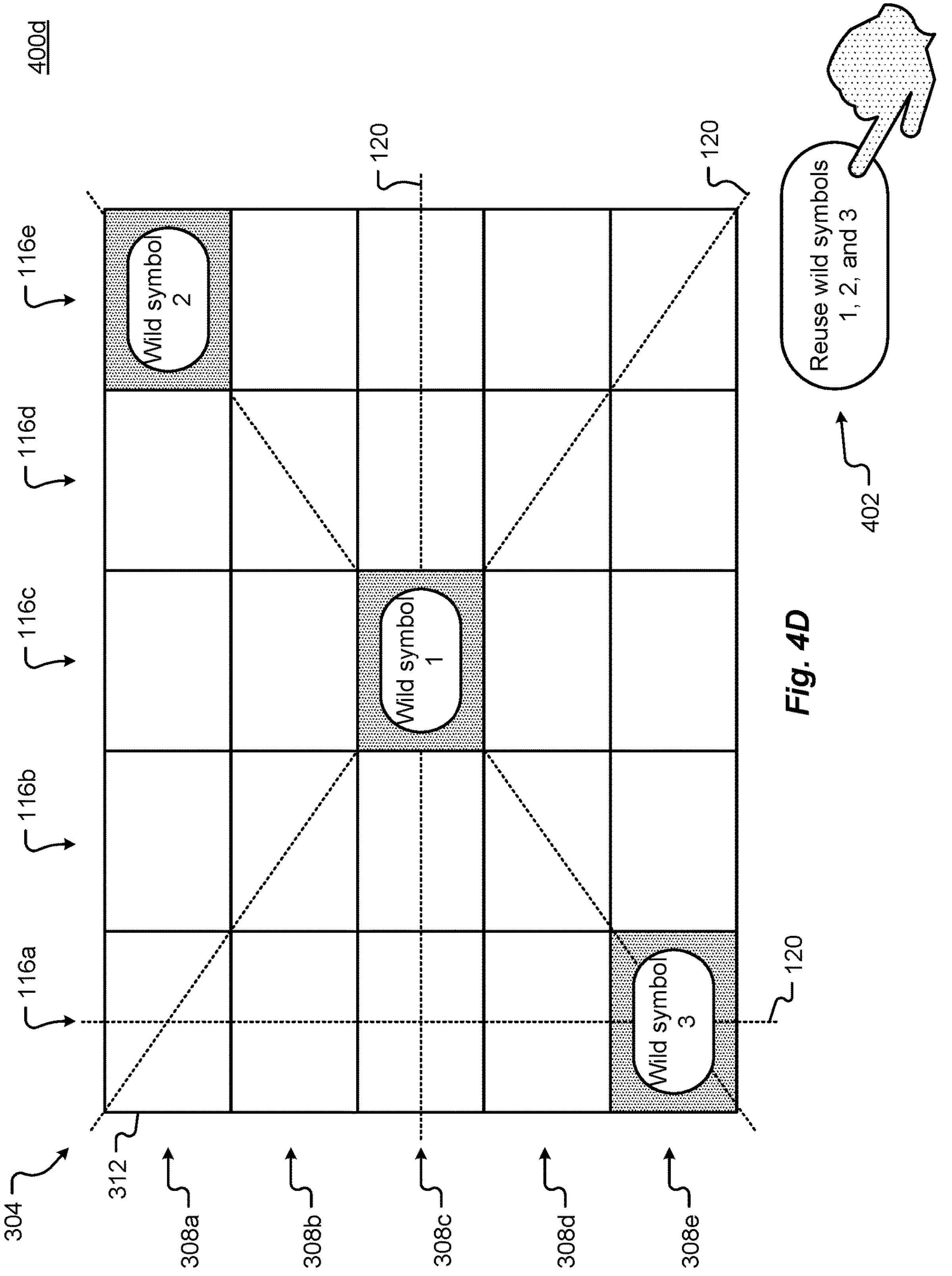
FIG. 4D illustrates a fourth output of the computational gaming device showing reusable wild symbols in the array of cells that are available to be reused from the losing plays of the grid-based game in FIGS. 4A to 4C.
Figure 4E:
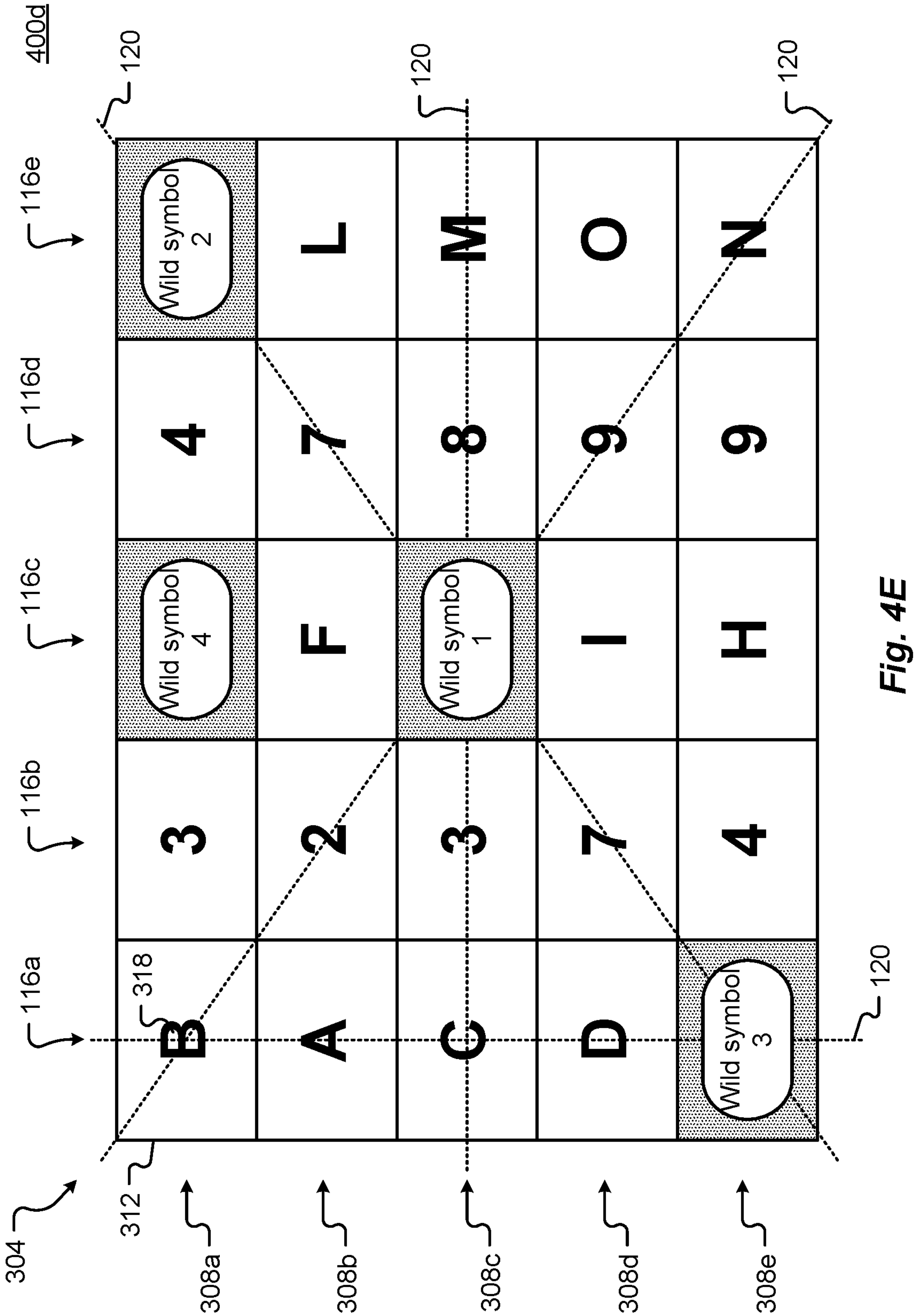
FIG. 4E illustrates a fifth output of the computational gaming device showing a fourth sequence of symbols including the reused wild symbols from FIG. 4D that are rendered for a winning play of the grid-based game.

After each play 400*a*, 400*b*, and 400*c*, the number of consecutive losing plays may be evaluated against a threshold number of losing plays to determine whether to provide the player with the option to reuse one or more of the wild symbols 1, 2, and 3 in an additional play. FIGS. 4D and 4E illustrate details for an example additional play 400*d*.

FIG. 4D illustrates an initial state of an additional play 400*d* where a mostly blank array of cells 304 are rendered on the display 104 in response to the processor 204 determining that the number consecutive losing plays meets or exceeds a threshold number. In the example of FIGS. 4A to 4D, the threshold number of losing plays is three (e.g., plays 400*a*, 400*b*, and 400*c*). Upon determining that the threshold number of consecutive losing plays is met or exceeds the threshold, the processor 204 may cause the display 104 to display or highlight an interactive feature 402, which may include a touch sensitive portion of the display 104, a mechanical button on the computational device 100, or other device capable of providing the player with the option to reuse wild symbols 1, 2, and/or 3 that landed in plays 400*a*, 400*b*, and 400*c* in play 400*d*. In conjunction with providing the interactive feature 402, the processor 204 may access the pointers stored for wild symbols 1, 2, and 3 and display each wild symbol in a cell position that is based on a respective pointer. In the example of FIG. 4D, each wild symbol 1, 2, and 3 appears in a same cell position as where that wild symbol landed in a respective losing play. For example, wild symbol 1 appears in a cell position that corresponds to column 116*c* and row 308*c*, which is the same cell position from losing play 400*a*.

As noted above, the player may indicate the desire to reuse wild symbols 1, 2, and 3 for the play 400*d* by selecting the interactive feature 402. FIG. 4E illustrates the sequences of symbols 318 generated for play 400*d* in response to the player indicating the desire to reuse wild symbols 1, 2, and 3 shown in FIG. 4D. Other than the wild symbols 1, 2, and 3, the sequences of symbols 318 may for play 400*d* may be randomly generated based on output of the random number generator 232. The additional play 400*d* may correspond to a winning play in that at least one combination of symbols along a pay line 120 corresponds to a predetermined game outcome that awards the player based on a wager applied to the pay line 120. In FIG. 4E, the winning combination of symbols may correspond to the diagonal pay line that includes the three wild symbols and two '7' symbols. In response to determining that 400*d* results in a winning combination of symbols, the pointers for wild symbols 1, 2, and 3 may be erased from the memory 208 and the counter for counting the number of consecutive losing plays may be reset.

As shown, the play 400*d* generated a wild symbol 4 that landed at column 116*c* and row 308*a* in the array of cells 304. In the event that the play 400*d* is a losing play (as in plays 400*a*, 400*b*, and 400*c*), the wild symbol instruction set 228 may cause the processor 204 to store a pointer for the wild symbol 4 in the same manner as that described above with respect to pointers for wild symbols 1, 2, and 3. In another additional play (e.g., a play that immediately follows the play 400*d*), the system may again provide the player with the option to reuse wild symbols 1, 2, 3, and/or 4 in the same manner as that described with reference to FIG. 4D. This process of storing pointers and providing the player with an option to reuse one or more wild symbols may occur until a play results in a winning combination of symbols.

Here, it should be appreciated that FIGS. 4D and 4E relate to a scenario where the cell position of each wild symbol in play 400*d* is maintained in a same cell position as in previous losing plays 400*a*, 400*b*, and 400*c*. However, as discussed in more detail below with reference to FIGS. 4F and 4G, example embodiments are not limited thereto.

Figure 4F:
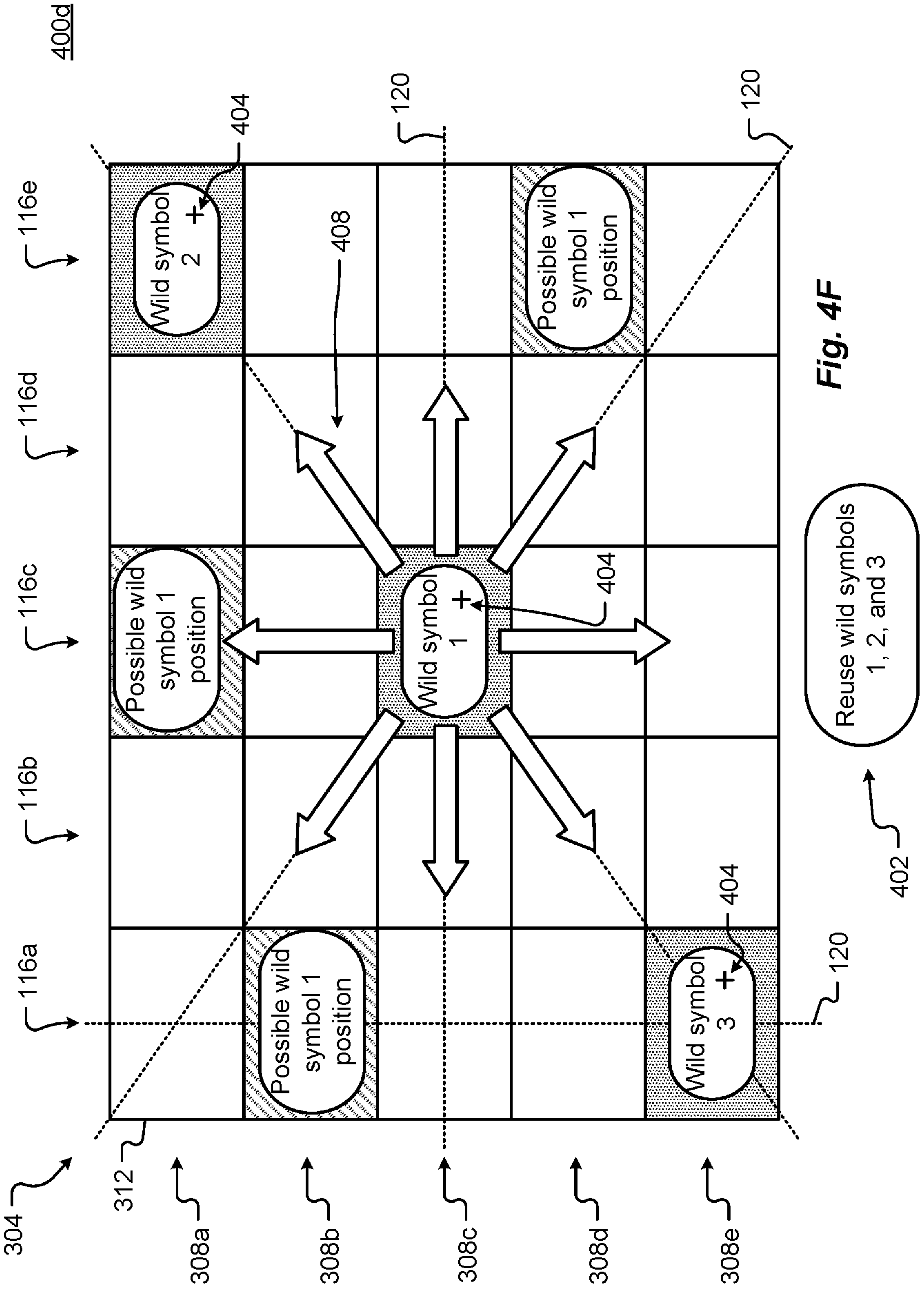
FIG. 4F illustrates a sixth output of the computational gaming device showing the option to move one of the reusable wild symbols from FIG. 4D to one or more possible wild symbol positions in the array of cells.
Figure 4G:
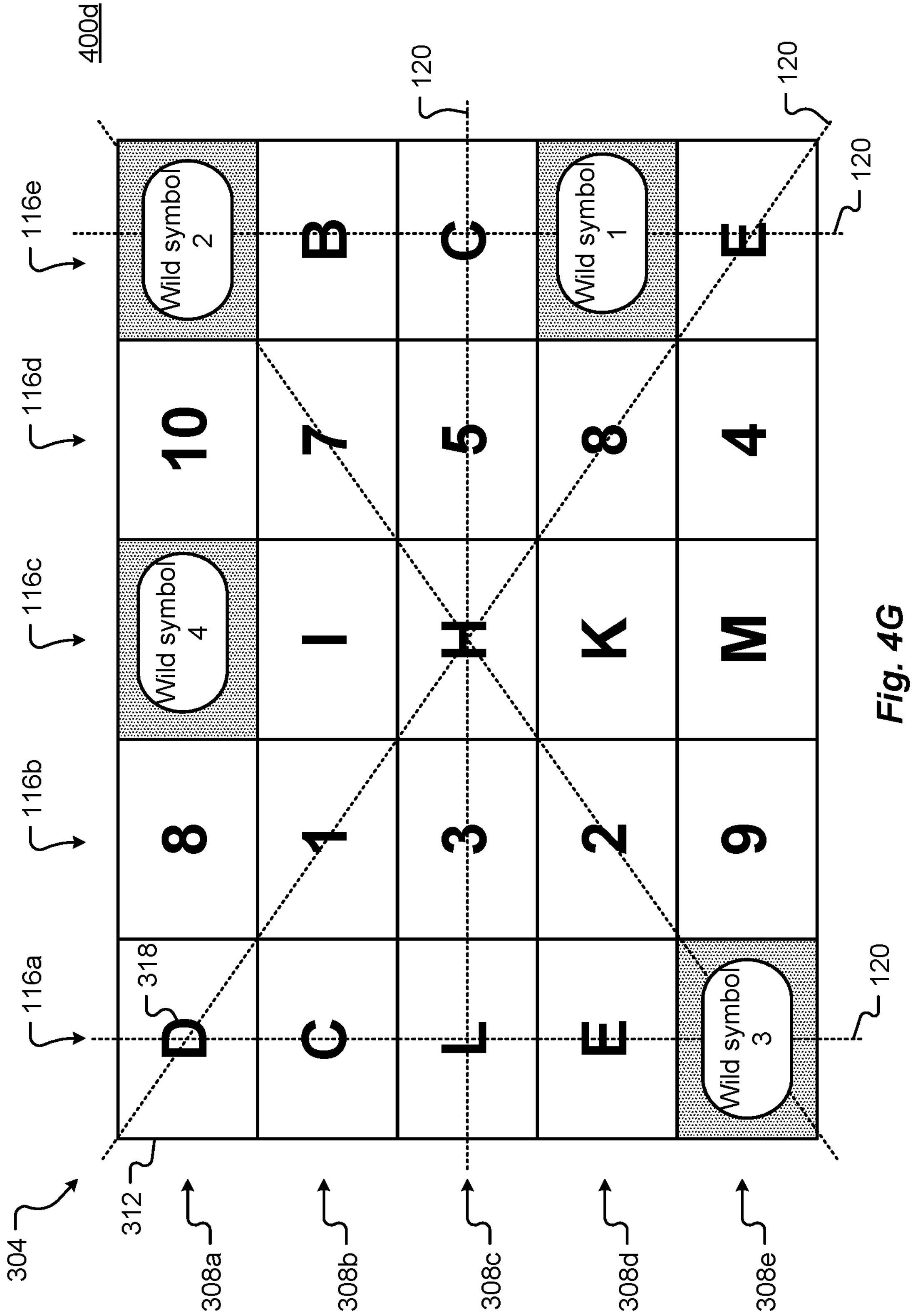
FIG. 4G illustrates a seventh output of the computational gaming device showing a fifth sequence of symbols including a reusable wild symbol that has been moved to one of the possible positions shown in FIG. 4F to result in a winning play of the grid-based game.

However, FIGS. 4F and 4G illustrate an example where a cell position of one or more of the wild symbols 1, 2, or 3 for play 400*d* is different compared to the cell position where that wild symbol appeared in a losing play 400*a*, 400*b*, or 400*c*.

With reference to FIG. 4F, wild symbols 1, 2, and/or 3 may be movable in at least one of the eight different directions shown for wild symbol 1. For example, as shown for wild symbol 1, a wild symbol may be rendered to the display screen 104 along with an identifying mark 404. Shown as crosshairs, or a "plus" symbol, the identifying mark 404 may indicate to a player that the wild symbol can be moved, or slid, to another cell 312 in the array of cells 304. In one embodiment, a player may interact with the identifying mark 404 (e.g., by selecting the wild symbol for movement by touching, or clicking, on the identifying mark 404) to move the wild symbol to another cell 312. The identifying mark 404 may be represented as a highlight, an underscore, an animated region of the cell 312 housing the wild symbol, an animated icon, any other icon, etc., and/or combinations thereof.

In response to the player interacting with the wild symbol and/or the identifying mark 404 associated with the wild symbol (e.g., by touching, clicking, etc., at an input device 108 or other user interface), the arrows in FIG. 4F may be displayed by the display 104 to show movement (e.g., sliding, etc.) options for the wild symbol. These movement options for the wild symbol are shown by the movement direction arrows 408 extending outwardly and away from the wild symbol in the array of cells 304. Depending on the rules of the game, the movement direction arrow 408 may define available movement options and/or movement restrictions for the wild symbol. For instance, in one set of rules, the wild symbol may only be moved from the cell 312 in which it first appeared along a column 116*a*-116*e* or along a row 308*a*-308*e* to another cell 312 in the same column 116*a*-116*e* or in the same row 308*a*-308*e*, respectively. In some embodiments, the wild symbol may only be moved from the cell 312 in which it first appeared along a payline 120 to another cell 312 running through the same pay line 120.

In some embodiments, the array of cells 304 may only include a single row 308*c* of cells 312 making up the array of cells 304. In this example, the movement direction arrows 408 may indicate that movement of the wild symbol is only available along a horizontal direction to a cell 312 that runs along a line in the horizontal direction. Alternatively, the array of cells 304 may only include a single column 116*c* of cells 312 making up the array of cells 304. In this alternative example, the movement direction arrows 408 may indicate that movement of the wild symbol is only available along a vertical direction to a cell 312 that runs along a line in the vertical direction.

In at least one embodiment, possible wild symbol positions are shown on the array of cells 304, where each possible wild symbol position indicates a cell position to which the player is allowed to move a particular wild symbol. These possible wild symbol positions may be generated differently for each wild symbol and displayed in response to selection of feature 402 and/or selection of a particular wild symbol for movement. FIG. 4F illustrates possible positions for wild symbol 1. Each possible wild symbol position may be generated according to rules and/or game outcomes for the grid-based game. In at least on example, each possible wild symbol position may be determined (e.g., predetermined) to have a known effect on the probability of the player achieving a winning combination of symbols in play 400*d*. The known effect may include no effect on the probability of winning, an increase in probability of winning, and/or decrease in probability of winning.

In at least one embodiment, movement of a wild symbol from its initial cell position may come at a cost to the player, for example, in the event that moving the wild symbol increases a win probability for the player for play 400*d*. For example, the player may be informed that moving wild symbol 1 to one of the possible wild symbol positions in FIG. 4F may require the player to wager additional credits from the player's account for the play 400*d*. The additional cost may be related to (e.g., proportional to) the increased win probability associated with moving the wild symbol to a particular possible wild symbol position.

FIG. 4G illustrates an example sequence of symbols 318 for the additional play 400*d* once the wild symbol 1 has been moved to one of the possible wild positions in FIG. 4F. Other than the wild symbols 1, 2, and 3 in FIG. 4G, the sequences of symbols 318 may for play 400*d* may be randomly generated based on output of the random number generator 232. The additional play 400*d* may correspond to a winning play in that at least one combination of symbols along a pay line 120 corresponds to a predetermined game outcome that awards the player based on a wager applied to the pay line 120. In FIG. 4G, the winning combination of symbols may correspond to the pay line at column 116*e* that includes wild symbols 1 and 2 and symbols 'B,' 'C,' and 'E.' In response to determining that 400*d* results in a winning combination of symbols, the pointers for wild symbols 1, 2, and 3 may be erased from the memory 208 and the counter for counting the number of consecutive losing plays may be reset.

As shown, the play 400*d* in FIG. 4G generated a wild symbol 4 that landed at column 116*c* and row 308*a* in the array of cells 304. In the event that the play 400*d* is a losing play (as in plays 400*a*, 400*b*, and 400*c*), the wild symbol instruction set 228 may cause the processor 204 to store a pointer for the wild symbol 4 in the same manner as that described above with respect to pointers for wild symbols 1, 2, and 3. In another additional play (e.g., a play that immediately follows the play 400*d*), the system may again provide the player with the option to reuse wild symbols 1, 2, 3, and/or 4 in the same manner as that described with reference to FIG. 4D. This process of storing pointers and providing the player with an option to reuse one or more wild symbols may occur until a play results in a winning combination of symbols.

Figure 4H:
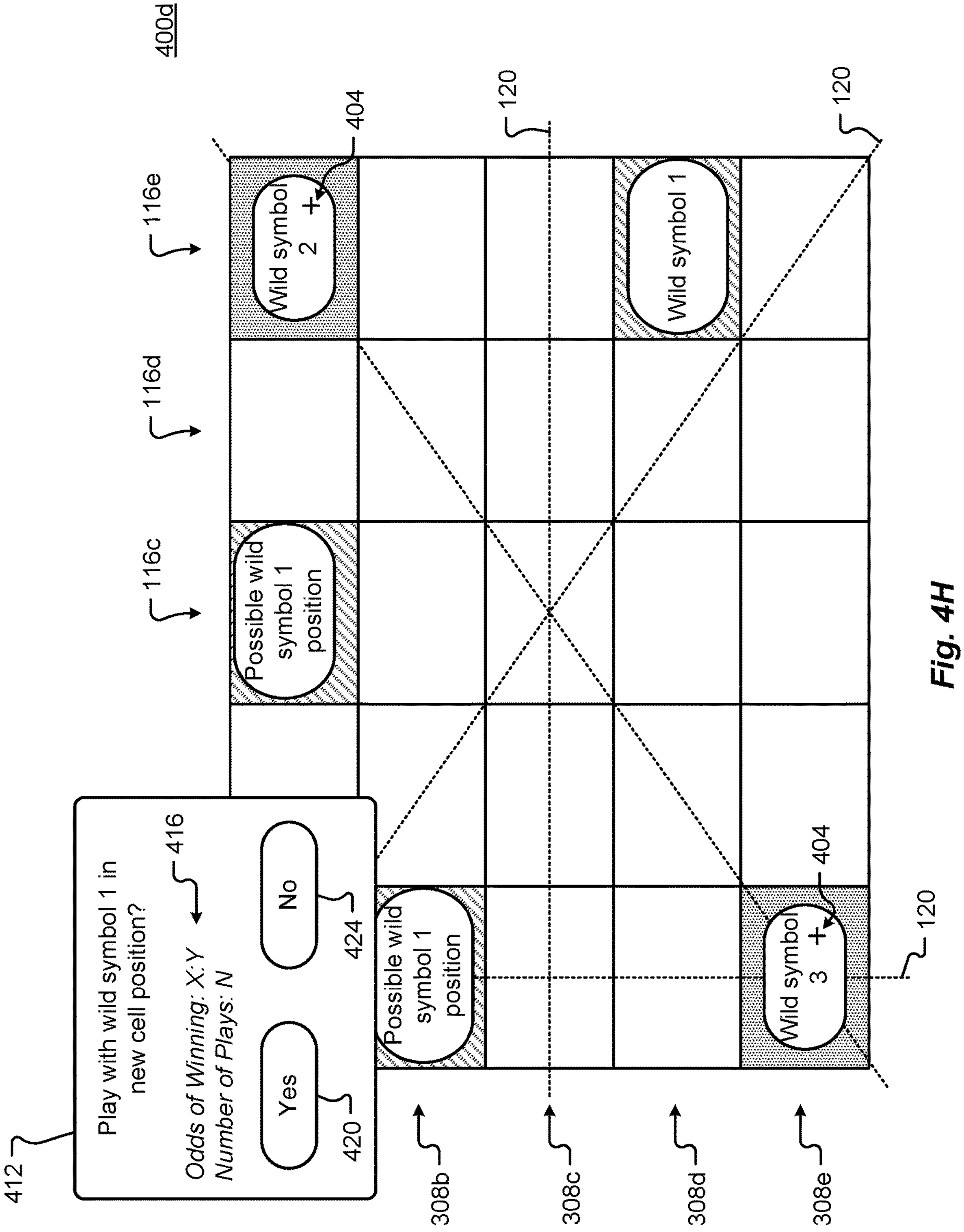
FIG. 4H illustrates an eighth output of the computational gaming device showing a pop-up window comprising subsequent play information and a user prompt rendered in response to moving the wild symbol to a different cell in the array of cells.

FIG. 4H illustrates an example pop-up window presented to the player upon moving a wild symbol to a new cell position as in FIG. 4F. When a player has dragged and dropped (e.g., released) the wild symbol 1 to a selected and available cell 312 in the array of cells 304, a pop-up window 412 may be presented to the player as shown in FIG. 5A. The pop-up window 412 may include a "yes" icon 420 and "no" icon 424 that are user-selectable icons. As can be appreciated, the desire of a player to initiate a subsequent play with the wild symbol 1 maintained in the player-selected cell 312 may be determined based on the player's response to the pop-up window 412. More specifically, if the player selects the "yes" icon 420, then the game instruction set 220 may call the wild symbol instruction set 228 whereas if the player selects the "no" icon 424, then the game instruction set 220 may continue operating without calling the wild symbol instruction set 228. In some embodiments, the pop-up window 412 may include a subsequent play information area 416. The subsequent play information area 416 may include information associated with the additional play 400*d* should the wild symbol 1 be maintained in the new cell position. This information may include subsequent play information comprising odds of obtaining a winning sequence of symbols 318 in the additional play 400*d* based on the position of the wild symbol in the sequence of symbols. In some embodiments, if a player selects the "no" icon 424, the player may be presented with the option of repositioning, or sliding, the wild symbol to a new cell location for the additional play 400*d*. The pop-up window 412, or at least a portion thereof, may be presented to the player as the player moves the wild symbol and hovers over the cells 312 in the array of cells 304. In this manner, the player may be able to observe the information rendered to the subsequent play information area 416 and determine any benefits of moving from one position to another before committing to a particular cell 312.

Figure 5:
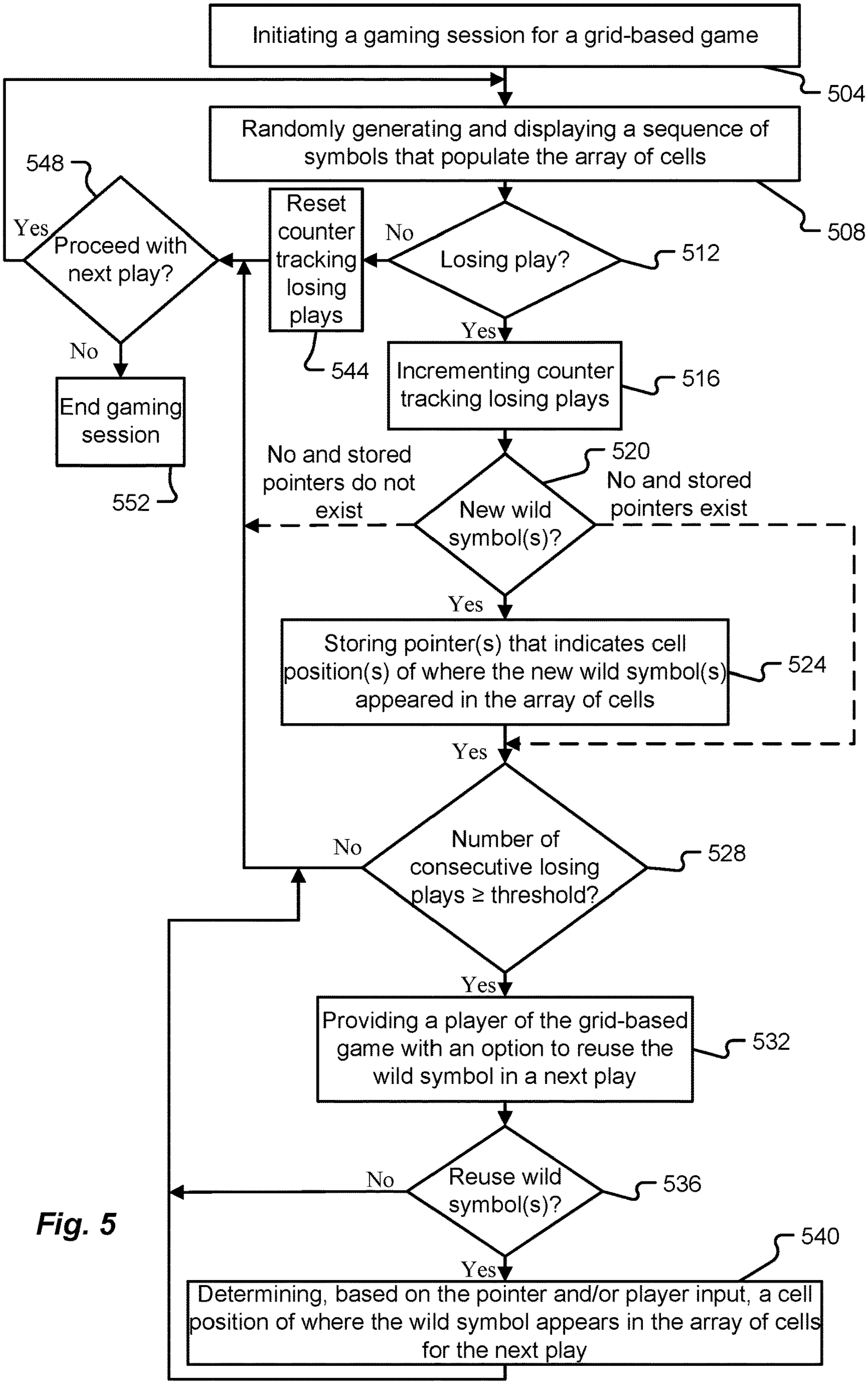
FIG. 5 is a flow diagram of an example process for enabling a reusable wild symbol operation in a grid-based game.

FIG. 5 is a flow diagram depicting a method of an example process for enabling a player to reuse a wild symbol according to at least one embodiment. The methods described herein may be run as a set of instructions on a computational device 100 and/or some other server in communication with the computational device 100. In some embodiments, the set of instructions may be part of an application installed on the computational device 100.

Operation 504 includes initiating a gaming session for a grid-based game. For example, a player initiates the gaming session for the grid-based game on a computational device 100 (e.g., a gaming machine, a mobile phone, a laptop, and/or the like). The game session may be initiated by the player through various elements of the computational device 100, such as input on the user interface 216, input to the ticket acceptance device 240, and/or input to the cash in device 244. Operation 504 enables the player to begin playing the grid-based game. The grid-based game may be arranged as an array of cells 304 configured to be populated with symbols 318 for plays of the grid-based game. In at least one example embodiment, the grid-based game is a slot game running on the computational device 100.

Operation 508 includes randomly generating and displaying a sequence of symbols 318 that populate the array of cells 304. The sequence of symbols 318 may be randomly generated based on output of the random number generator 232 and displayed. The populated array of cells 304 may be displayed on a display screen 104. Operation 508 may occur in response to player input on the computational device 100 to initiate a play of the grid-based game, which may include the player placing wagers on pay lines 120 and triggering the play with input on the user interface 216.

Operation 512 includes determining whether the play from operation 508 is a losing play. If not, the method proceeds to operations 544 and 548 to reset a counter (e.g., within the processor 204) tracking a number of consecutive losing plays and to prompt the player to proceed with a next play. If the player decides to proceed with the next play (e.g., by providing input on the user interface 216), the method returns to operation 508 to randomly generate and display another sequence of symbols for the next play. If the player does not decide to proceed with the next play, the method proceeds to operation 552 to end the gaming session, meaning that the player is finished playing the game, which may reset all counters and erase all stored pointers from memory. Alternatively, ending the gaming session in operation 552 may include maintaining all counters and all stored pointers to enable the player to restart the gaming session initiated in operation 504 at a later time. If the play from operation 508 is a losing play, the method proceeds to operation 516.

Operation 516 includes incrementing the counter that is tracking the number of consecutive losing plays. For example, operation 516 increments the counter by one to count the play in operation 508 as a losing play.

Operation 520 includes determining whether the losing play from operation 508 includes a new wild symbol or new wild symbols. If not, the method proceeds to operation 528 or to operation 548. As noted above, a wild symbol is a symbol that is useable with any other symbol to create one or more winning combinations of symbols for a play of the grid-based game. A new wild symbol determined to exist in operation 520 may be a wild symbol that does not yet have a pointer stored for that wild symbol. In other words, iterating through the operations in FIG. 5 may result in multiple wild symbols available for reuse in a next play of the grid-based game. In this case, operation 520 identifies any wild symbols that have not already been designated as re-useable by a previous iteration of the method in FIG. 5. Whether the method proceeds to operation 528 or 548 depends on whether there are any pointers stored from a previous iteration of the method in FIG. 5. If stored pointers do not exist, the method proceeds to operation 548 to prompt the player to proceed with the next play. If stored pointers exist, the method proceeds to operation 528.

If the determination in operation 520 is 'yes,' the method proceeds to operation 524. Operation 524 includes storing a pointer or pointers that indicates a cell position or cell positions of where the new wild symbol(s) appeared in the array of cells 304 as a result of the play in operation 508. The pointer may include the column/row coordinates of a cell 312 in the array of cells 304 or cell identifier unique to each cell 312. The pointer may be stored in memory 208 and be used to determine the cell position(s) of the new wild symbol(s) in the next play of the grid-based game in operation 540.

Operation 528 includes determining whether a number of consecutive losing plays is greater than or equal to a threshold number of losing plays. If not, the method proceeds to operation 548. If so, the method proceeds to operation 532. The threshold number of losing plays may be a design parameter set based on empirical evidence and/or preference. In at least one example, the threshold number of losing plays is three. In another example, the threshold number of losing plays may be adjusted upward or downward by the player at a cost or benefit to the player depending on whether the adjustment increases the probability of winning on the next play (which may trigger an additional cost for the player in the form of more credits, for example) or decreases the probably of winning on the next play (which may trigger some benefit for the player, such as adding a multiplier for the next play).

Operation 532 includes providing the player with an option to reuse a wild symbol or wild symbols that have stored pointers. The option to reuse the wild symbol(s) in the next play may be presented to the player as in FIG. 4D as a feature 402. In at least one embodiment and in a case where there are multiple re-usable wild symbols, the option includes providing the player with a choice of which and/or how many wild symbols to reuse. The choice may require that the player select a minimum and/or maximum number of re-useable wild symbols and may come at a cost or a benefit to the player in the same manner as that described above for operation 528. For example, the player may be prompted to forfeit more credits to select more than a nominal number of reusable wild symbols for inclusion in the sequence of symbols in the next play.

Operation 536 includes determining whether the player opted to reuse the wild symbol(s) presented in operation 532. If not, the method proceeds to prompt the player to proceed with the next play in operation 548. In this case, any pointer stored in operation 524 is maintained in memory 208 for the next iteration of the method so that the wild symbols associated with these pointers are available for re-presentation to the player in a subsequent play for the player to select whether to reuse any wild symbols. If the determination in operation 536 is 'yes,' then the method proceeds to 540. The determination in operation 536 may be aided by player input, for example, on the user interface 216 that indicates whether the player wishes to re-use a wild symbol from a losing play. In addition, operation 536 may provide the player with the ability to select which and/or how many wild symbols to reuse or select which and/or how many wild symbols to "save" for future plays.

Operation 540 includes determining, based on the pointer and/or player input, the cell position(s) of where the wild symbol(s) selected for reuse in operation 536 appears in the next play. The method then proceeds with prompting the player to proceed with the next play in operation 548. As discussed above, in at least one embodiment the cell position of a reused wild symbol in the next play may be the same cell position as where that wild symbol appeared in a losing play. In this case, operation 540 may determine the cell position based on only the pointer (and not the player input). In another embodiment, the cell position of a reused wild symbol in the next play is different than the cell position of where that reused wild symbol appeared in the losing play. In this case, operation 540 may determine the cell position based on the pointer, the player input, or both. For example, the pointer may be useful for showing the player the cell position of the reused wild symbol in the losing play and for generating one or more possible wild symbol positions (see FIG. 4F), while the player input from the player may be used to select one of the possible wild symbol positions for the next play.

Figure 6:
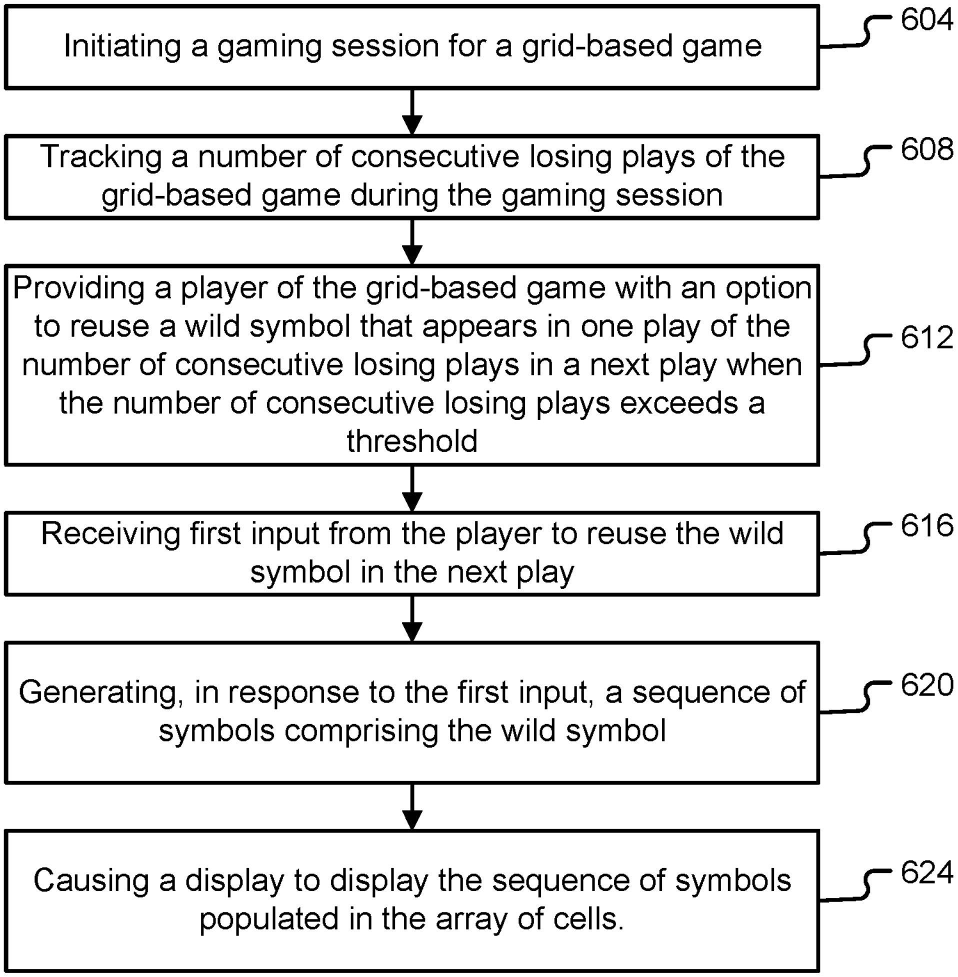
FIG. 6 is a flow diagram of an example process for enabling a reusable wild symbol operation in a grid-based game.

FIG. 6 is a flow diagram depicting a method of an example process for enabling a player to reuse a wild symbol according to at least one embodiment. The methods described herein may be run as a set of instructions on a computational device 100 and/or some other server in communication with the computational device 100. In some embodiments, the set of instructions may be part of an application installed on the computational device 100. One or more operations in the method of FIG. 6 may overlap with one or more operations in FIG. 5.

Operation 604 includes initiating a gaming session for a grid-based game arranged as an array of cells 304 configured to be populated with symbols 318 for plays of the grid-based game.

Operation 608 includes tracking a number of consecutive losing plays of the grid-based game during the gaming session. Losing plays may be plays that do not produce at least one winning combination of symbols along at least one pay line 120.

Operation 612 includes providing a player of the grid-based game with an option to reuse a wild symbol that appears in one play of the number of consecutive losing plays in a next play when the number of consecutive losing plays exceeds a threshold. For example, the option is provided to the player in the way of a prompt on the user interface 216 for the user to select whether to reuse the wild symbol by providing input to an input device (e.g., a part of the user interface 216).

Operation 616 includes receiving first input from the player to reuse the wild symbol in the next play. For example, the player provides the first input to the input device mentioned above to indicate that the player wishes to reuse the wild symbol in the next play (or other future play).

Operation 620 includes generating, in response to the first input from the player, a sequence of symbols comprising the wild symbol for the next play. Some or all symbols in the sequence of symbols other than the wild symbol may be randomly generated for the next play based on output of the random number generator 232.

Operation 624 includes causing a display to display the sequence of symbols populated in the array of cells 304 for the next play. For example, each symbol in the sequence of symbols populates one cell in the array of cells 304 on the user interface 216.

Here, it should be appreciated that the method in FIG. 6 may include storing a pointer that indicates a first cell position of where the wild symbol appears in the array of cells 304 for the one play of the losing plays, and determining, based on the pointer, a second cell position of where the wild symbol appears in the array of cells for the next play. Storing the pointer may occur between operations as part of operation 608 in accordance with operations described with reference to FIG. 5 (e.g., operation 608 may encompass or include operations 512 to 528). Determining the second cell position may occur as part of operations 616 and/or 620 (see also, operation 540).

In at least one implementation of the method of FIG. 6, the first cell position and the second cell position correspond to a same cell position in the array of cells 304. In at least one other implementation, the first cell position and the second cell position correspond to different cell positions in the array of cells 304. For example, as discussed above with reference to operation 540, the second cell position of where the wild symbol appears may be based on second input by the player and/or the pointer.

Although not explicitly shown in FIG. 6, it should be appreciated that the method may include providing the player with the option to again reuse the wild symbol in an additional play subsequent to the next play when the next play results in a losing combination of symbols. For example, the player is continuously provided with the option to reuse the wild symbol (and potentially other wild symbols that appear in losing plays) until a winning play occurs (e.g., at least one winning combination of symbols appears along at least one pay line 120). Upon encountering a winning play, the method may include resetting the counter that is tracking the number of consecutive losing plays.

FIGS. 5 and 6 are discussed with respect to tracking a number of consecutive losing plays and providing an option to a player to reuse a wild symbol from at least one of these losing plays when the number of consecutive losing plays exceeds a threshold. However, example embodiments may additionally or alternatively track a number of winning plays and a number of losing plays over a specified period of time and provide the player with the same option to reuse a wild symbol if one or more conditions are met over the specified period of time. For example, the option to reuse a wild symbol may be provided when a ratio of a number of losing plays to a number of winning plays exceeds a threshold ratio over the specified period of time, a total number losing plays exceeds a threshold over the specified period of time, a total number of winning plays is below a threshold over the specified period of time, and/or the like.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method, comprising:

rendering, when a number of consecutive losing plays of a grid-based game exceeds a threshold, a first visual change to a user interface to notify a player of the grid-based game that selection of an interactive feature on the user interface will reuse a wild symbol that appears in one play of the number of consecutive losing plays in a next play, the grid-based game being displayed on a display of the user interface as an array of cells;

receiving an electronic signal indicative of the player selecting the interactive feature on the user interface to reuse the wild symbol in the next play;

rendering, for the next play and based on output of a random number generator, a sequence of symbols to the array of cells displayed on the display of the user interface, the sequence of symbols including the wild symbol; and rendering, when the sequence of symbols for the next play results in a winning combination of symbols, a second visual change to the user interface to notify the player that selection of the interactive feature to reuse the wild symbol is not available for at least one play subsequent to the next play.

2. The method of claim 1, further comprising:

storing a pointer that indicates a first cell position of where the wild symbol appears in the array of cells for the one play of the losing plays; and determining, based on the pointer, a second cell position of where the wild symbol appears in the array of cells for the next play.

3. The method of claim 2, wherein the first cell position and the second cell position correspond to a same cell position in the array of cells.

4. The method of claim 2, wherein the first cell position and the second cell position correspond to different cell positions in the array of cells.

5. The method of claim 2, wherein the second cell position of where the wild symbol appears is based on second input by the player and the pointer.

6. The method of claim 1, further comprising:

maintaining the first visual change on the user interface to continue to notify the player that selection of the interactive feature will reuse the wild symbol in an additional play subsequent to the next play when the next play results in a losing combination of symbols, wherein causing the first visual change comprises highlighting the interactive feature on the user interface.

7. The method of claim 1, further comprising:

resetting a counter tracking the number of consecutive losing plays when the next play results in a winning combination of symbols.

8. A device, comprising:

a processor; and memory comprising instructions that when executed by the processor cause the processor to:

initiate a gaming session for a grid-based game, the grid-based game being arranged as an array of cells to be populated with symbols on a user interface;

determine, during the gaming session, that a losing play of the grid-based game comprises a wild symbol;

determine that a number of consecutive losing plays exceeds a threshold;

render, in response to determining that the number of consecutive losing plays exceeds the threshold, a first visual change to the user interface to notify a player of the grid-based game that selection of an interactive feature on the user interface will reuse the wild symbol in a next play;

receive an electronic signal indicative of the player selecting the interactive feature on the user interface to reuse the wild symbol in the next play;

render, for the next play and based on output of a random number generator, a sequence of symbols to the array of cells displayed on the display of the user interface, the sequence of symbols including the wild symbol; and cause, when the sequence of symbols for the next play results in a winning combination of symbols, a second visual change to the user interface to notify the player that selection of the interactive feature to reuse the wild symbol is not available for at least one play subsequent to the next play.

9. The device of claim 8, wherein the instructions comprise instructions that cause the processor to:

store, in the memory, a pointer indicating a first cell position of where the wild symbol appeared in the array of cells for the losing play;

determine, based on the pointer, a second cell position of where the wild symbol appears in the array of cells for the next play; and cause, for the next play, the display to display a sequence of symbols populated in the array of cells with the wild symbol in the second cell position in the array of cells.

10. The device of claim 9, wherein the second cell position is determined based on the pointer and additional player input.

11. The device of claim 10, wherein the instructions comprise instructions that cause the processor to:

generate a prompt for the player to provide the additional player input via an input device.

12. The device of claim 11, wherein the additional player input comprises a selection of the second cell position.

13. The device of claim 11, wherein the prompt comprises highlighting a portion of the input device to indicate where the player provides the additional player input.

14. The device of claim 9, wherein the instructions comprise instructions that cause the processor to:

maintain the pointer in the memory when the next play results in a losing combination of symbols.

15. The device of claim 8, wherein the sequence of symbols for the next play, other than the wild symbol, are positioned in the array of cells based on the output of the random number generator.

16. A gaming device, comprising:

a user interface comprising a display;

a processor; and memory comprising instructions that when executed by the processor cause the processor to:

render, when a number of losing plays of a grid-based game exceeds a threshold, a first visual change to a display of the user interface to notify a player of the grid-based game that selection of an interactive feature on the user interface will reuse a wild symbol that appears in one play of the number of losing plays in a next play, the grid-based game being displayed on the display of the user interface as an array of cells;

receive an electronic signal indicative of the player selecting the interactive feature on the display of the user interface to reuse the wild symbol in the next play;

render, for the next play and based on output of a random number generator, a sequence of symbols to the array of cells displayed on the display of the user interface, the sequence of symbols including the wild symbol; and render, when the sequence of symbols for the next play results in a winning combination of symbols, a second visual change to the display of the user interface to notify the player that selection of the interactive feature to reuse the wild symbol is not available for at least one play subsequent to the next play.

17. The gaming device of claim 16, wherein the instructions comprise instructions that cause the processor to:

maintain the first visual change on the display of the user interface to continue to notify the player that selection of the interactive feature will reuse the wild symbol in an additional play subsequent to the next play when the next play results in a losing combination of symbols, wherein rendering the first visual change comprises rendering the interactive feature to the display.

18. The gaming device of claim 16, wherein, for the next play, the wild symbol appears in a selected cell position of the array of cells.

19. The gaming device of claim 16, wherein the number of losing plays is a consecutive number of losing plays.

* * * * *